(12) United States Patent
Brandt et al.

(10) Patent No.: US 12,184,222 B2
(45) Date of Patent: Dec. 31, 2024

(54) RACK READY ROOF MOUNTS

(71) Applicant: Wencon Development, Inc., Hayward, CA (US)

(72) Inventors: Yann Brandt, Walnut Creek, CA (US); Duane Menton, Vallejo, CA (US); Alexander Parsley, Pittsburg, CA (US); Susan Stark, Branchville, CA (US)

(73) Assignee: Wencon Development, Inc., Hayward, CA (US)

( * ) Notice: Subject to any disclaimer, the term of this patent is extended or adjusted under 35 U.S.C. 154(b) by 290 days.

(21) Appl. No.: 17/438,444

(22) PCT Filed: Mar. 12, 2020

(86) PCT No.: PCT/US2020/022486
§ 371 (c)(1),
(2) Date: Sep. 12, 2021

(87) PCT Pub. No.: WO2020/186115
PCT Pub. Date: Sep. 17, 2020

(65) Prior Publication Data
US 2022/0166370 A1 May 26, 2022

Related U.S. Application Data

(60) Provisional application No. 62/817,535, filed on Mar. 12, 2019.

(51) Int. Cl.
*H02S 20/23* (2014.01)
*F24S 25/61* (2018.01)
(Continued)

(52) U.S. Cl.
CPC .............. *H02S 20/23* (2014.12); *F24S 25/61* (2018.05); *F24S 2025/021* (2018.05); *F24S 2025/6006* (2018.05)

(58) Field of Classification Search
CPC ..... H02S 20/23; F24S 25/61; F24S 2025/021; F24S 2025/6006
See application file for complete search history.

(56) References Cited

U.S. PATENT DOCUMENTS 7,762,027 B1 * 7/2010 Wentworth ............. F24S 25/61
126/621
8,136,311 B2 * 3/2012 Liu ......................... F24S 25/61
52/173.3
(Continued)

FOREIGN PATENT DOCUMENTS

WO WO-2012163570 A1 * 12/2012 ......... E04D 13/1407

*Primary Examiner* — Eret C McNichols
(74) *Attorney, Agent, or Firm* — Mathew J. Temmerman; Temmerman Law

(57) ABSTRACT

A roof mount system and related method for installing solar panel racking components on a roof structure at the time of roof installation during building construction or roof replacement. The roof mount apparatus includes at least one flashing, at least one flashing projection, at least one fastener, a block member, a seal member and a cap member. The at least one fastener connects the at least one flashing member to the roof structure to secure the block member and the seal member. The seal member provides a water-tight securement and reduces wear and tear of the roof structure. The cap, fastener, and block are removable, and once removed, additional solar racking components are installed. This embodiment reduces the up-front cost of the solar components, and provides aesthetically pleasing low-profile temporary mounts to the roof surface.

20 Claims, 55 Drawing Sheets

(51) Int. Cl.
    *F24S 25/00*           (2018.01)
    *F24S 25/60*           (2018.01)

(56) References Cited

U.S. PATENT DOCUMENTS

| | | | |
|---|---|---|---|
| 8,448,405 B2 * | 5/2013 | Schaefer | E04D 13/1407 |
| | | | 52/60 |
| 8,448,407 B1 | 5/2013 | Wiener | |
| 8,713,858 B1 | 5/2014 | Xie | |
| 9,212,833 B2 * | 12/2015 | Stearns | H01Q 1/1207 |
| 9,350,289 B1 | 5/2016 | Zvanut et al. | |
| 9,447,988 B2 * | 9/2016 | Stearns | E04D 13/00 |
| 9,906,188 B2 * | 2/2018 | Almy | H02S 20/30 |
| 10,337,764 B2 * | 7/2019 | Ash | F24S 25/00 |
| 10,359,069 B2 * | 7/2019 | Ash | F16B 39/34 |
| 10,601,361 B2 * | 3/2020 | Tomolillo | H02S 30/00 |
| 10,998,847 B2 * | 5/2021 | Stephan | F24S 40/80 |
| 2012/0144760 A1 | 6/2012 | Schaefer et al. | |
| 2015/0361668 A1 | 12/2015 | Stearns et al. | |
| 2016/0134230 A1 * | 5/2016 | Meine | H02S 20/23 |
| | | | 52/698 |
| 2017/0288602 A1 * | 10/2017 | Meine | H02S 20/23 |
| 2018/0069502 A1 | 3/2018 | Wentworth et al. | |
| 2018/0274238 A1 * | 9/2018 | Aliabadi | E04D 13/00 |
| 2019/0211563 A1 | 7/2019 | Nash et al. | |
| 2021/0067083 A1 * | 3/2021 | Stephan | F24S 25/67 |
| 2022/0403862 A1 * | 12/2022 | Justice | H02S 20/23 |
| 2023/0184276 A1 * | 6/2023 | Katz | F16B 5/02 |
| | | | 403/376 |

\* cited by examiner

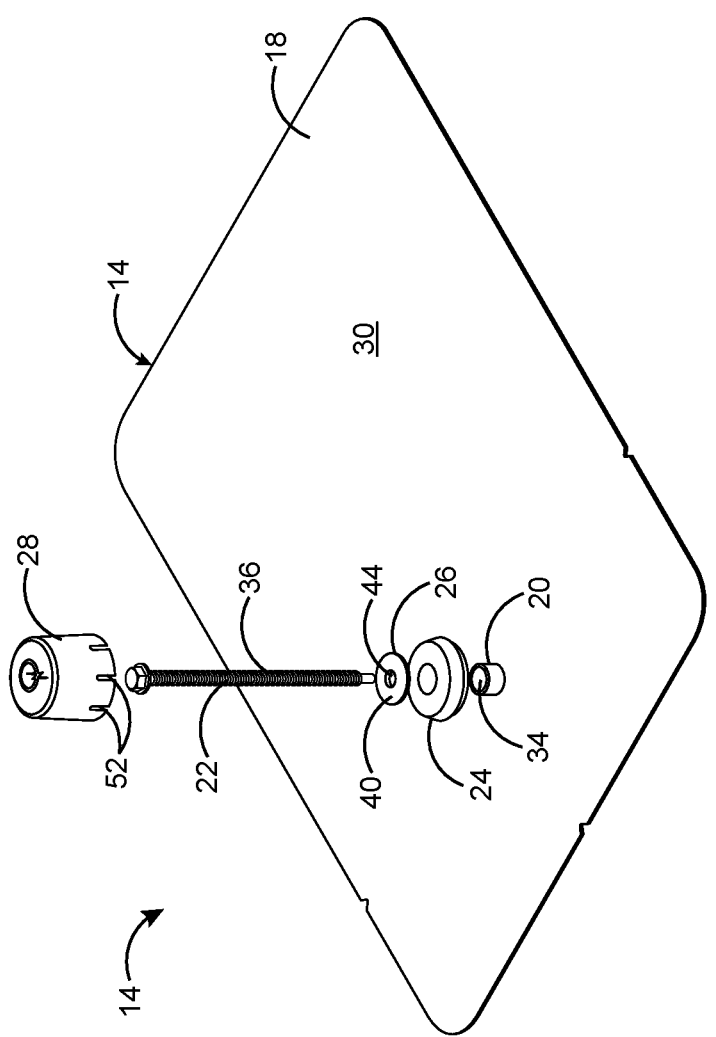

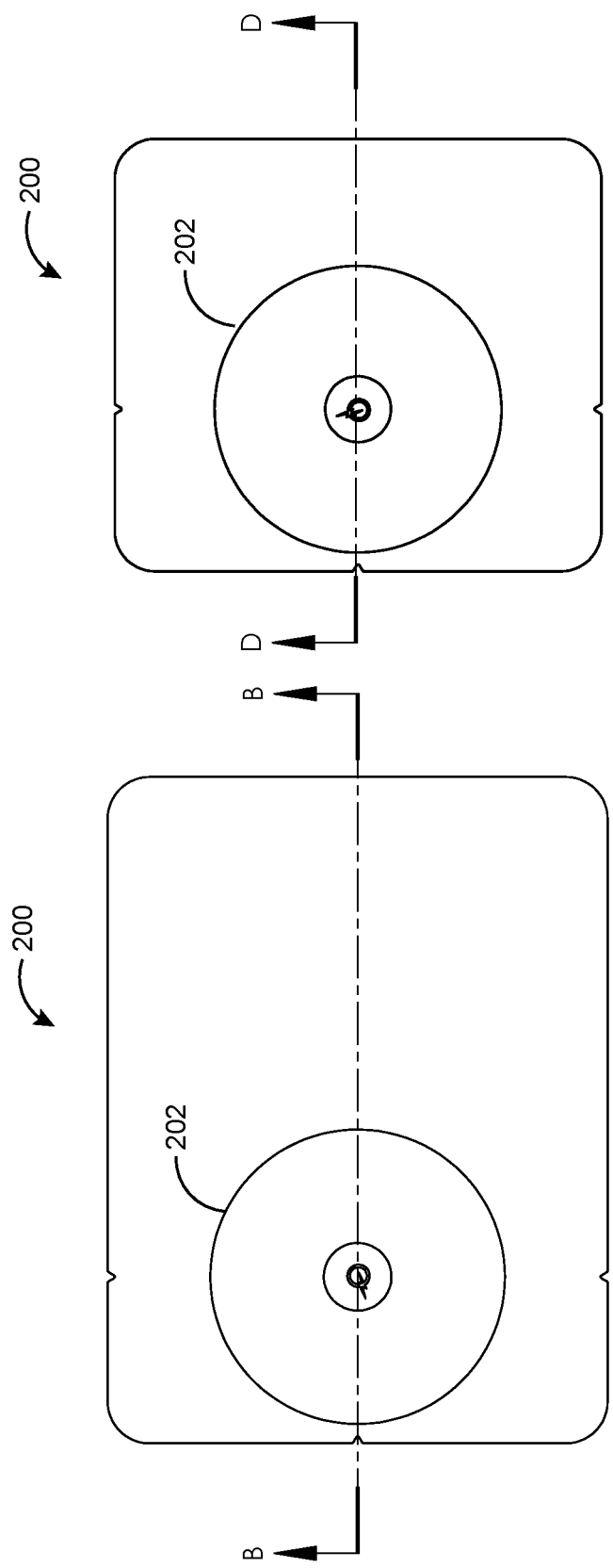

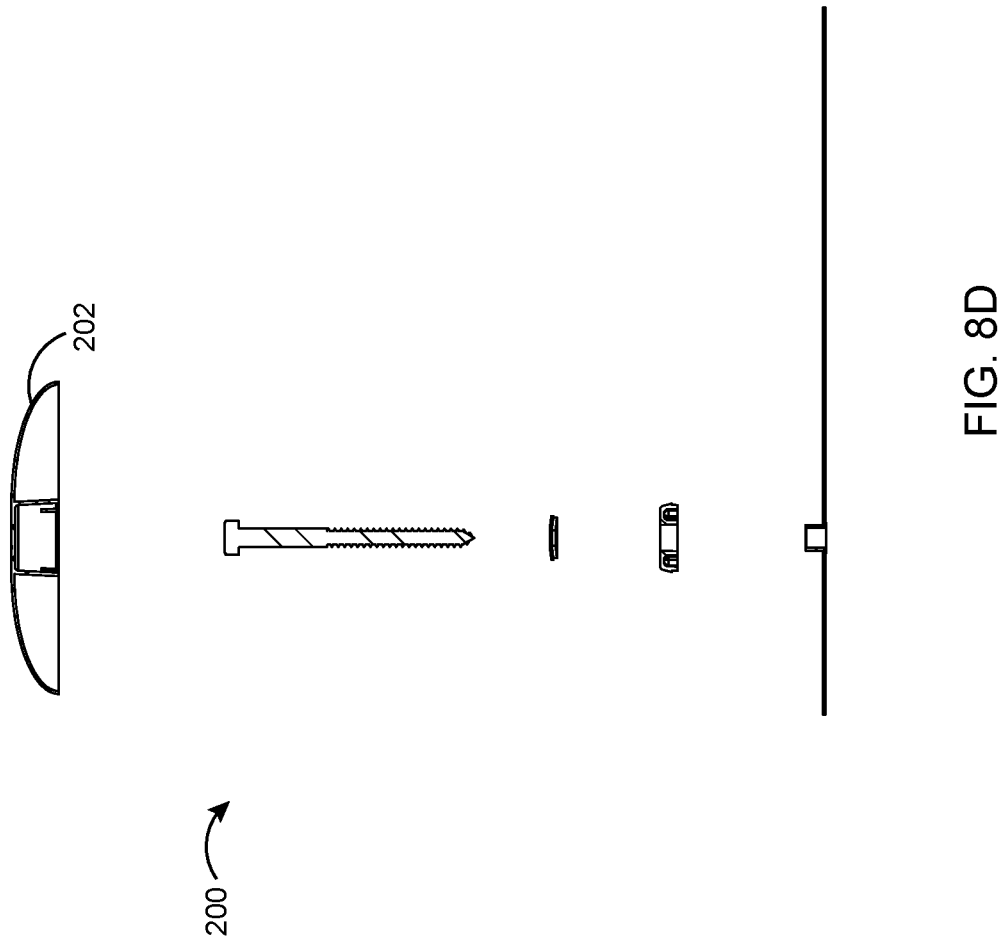

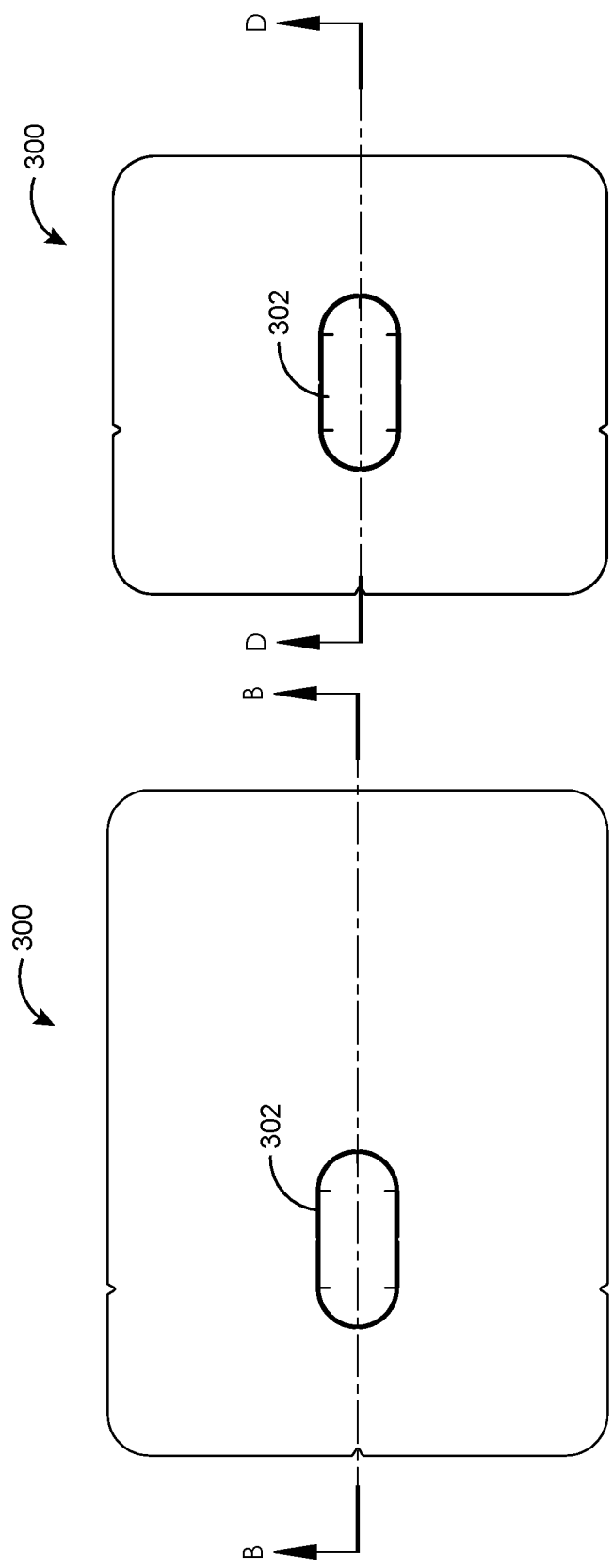
FIG. 9 B2
FIG. 9 B1

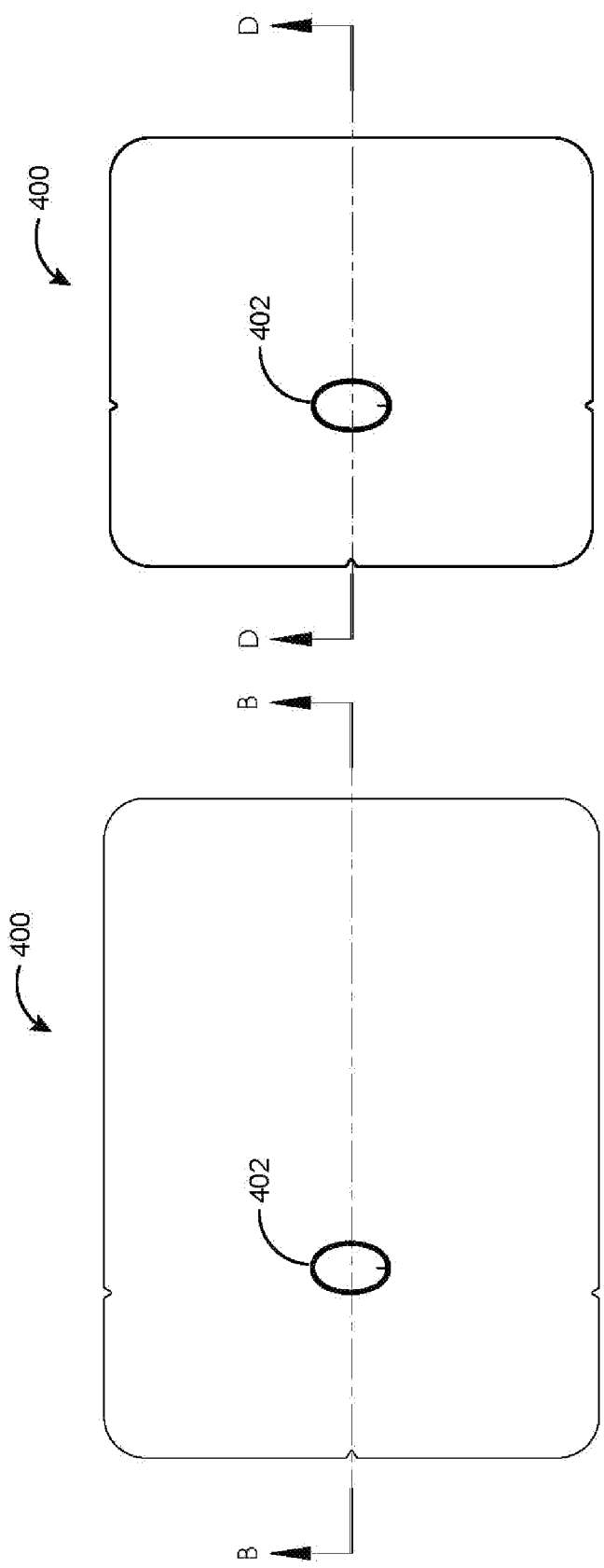
FIG. 10 B2
FIG. 10 B1

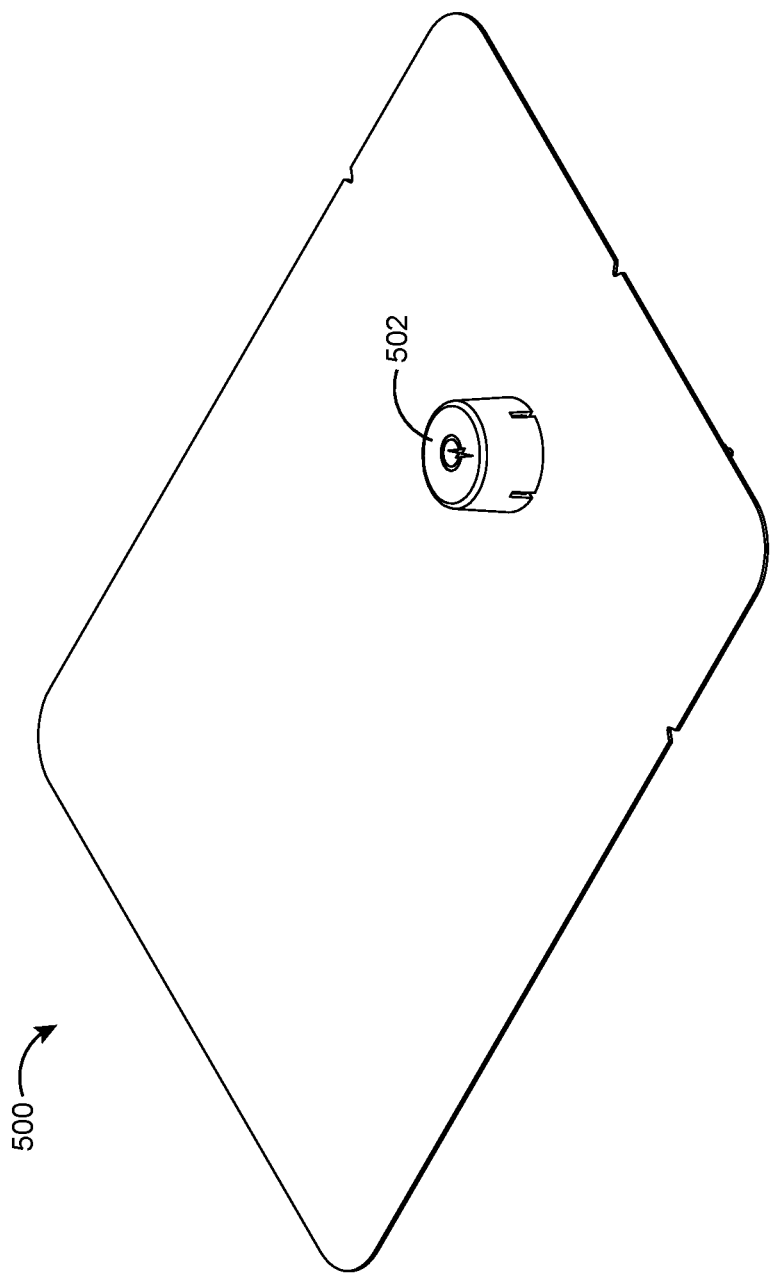

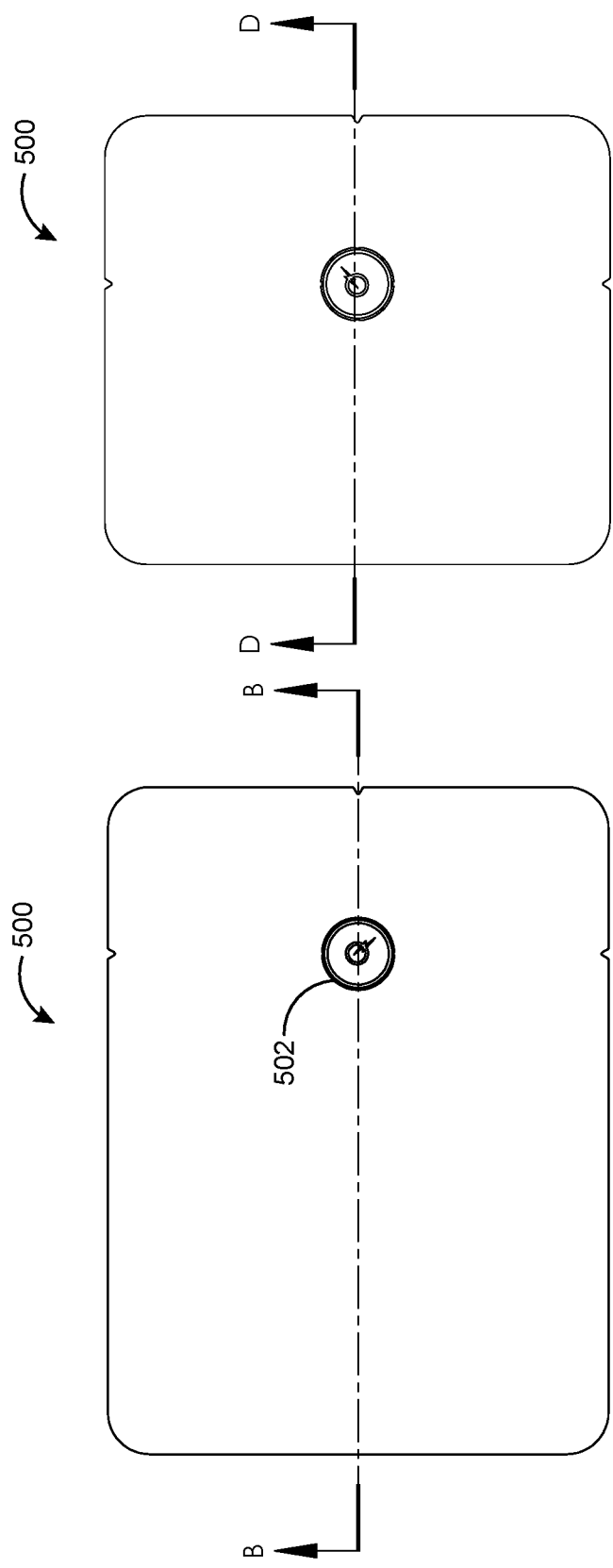

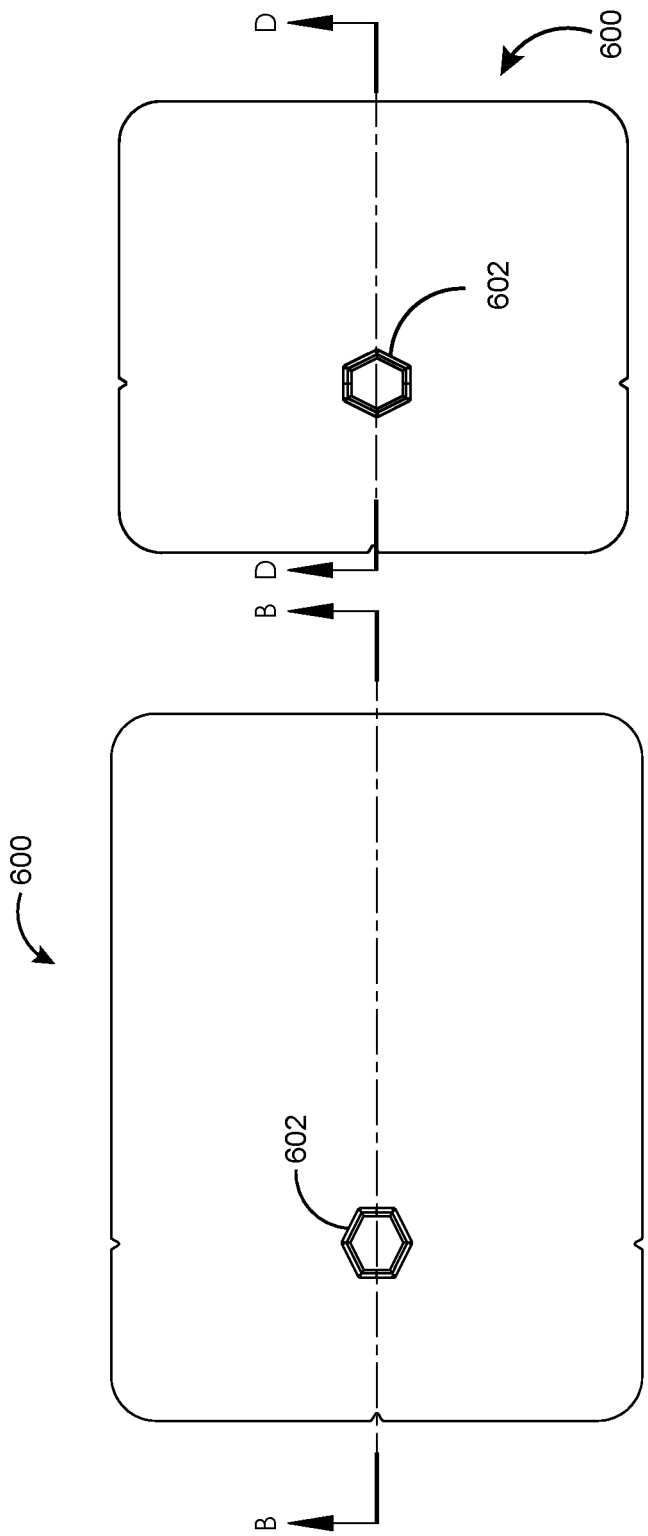

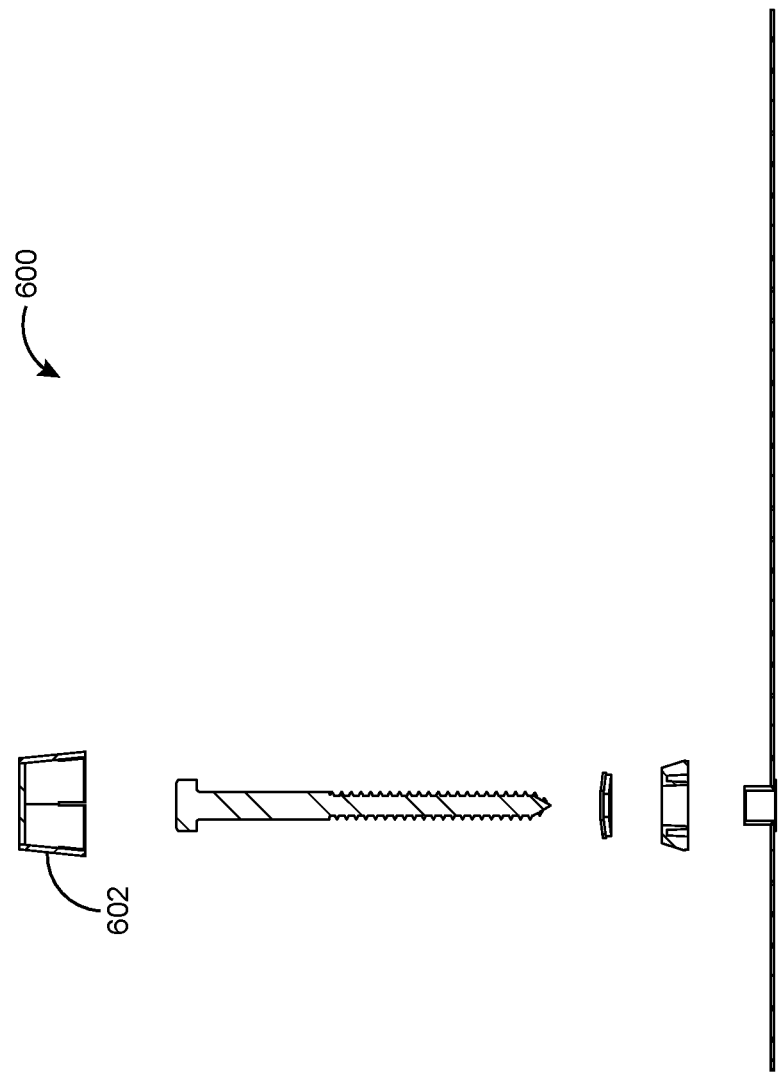

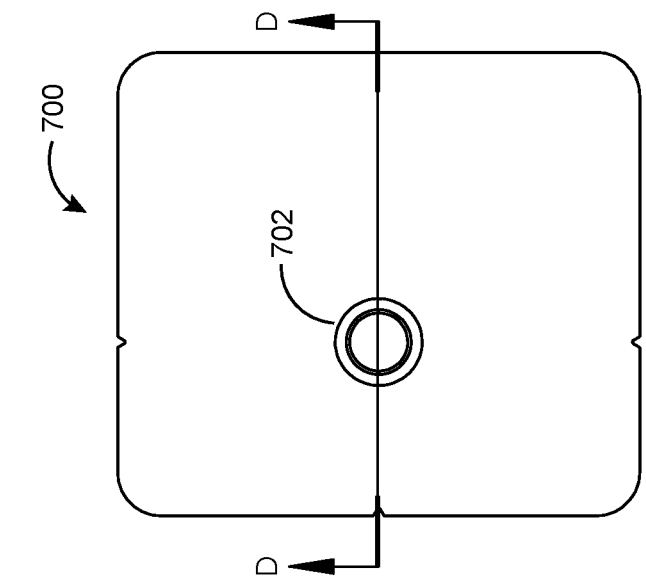
FIG. 13 B2
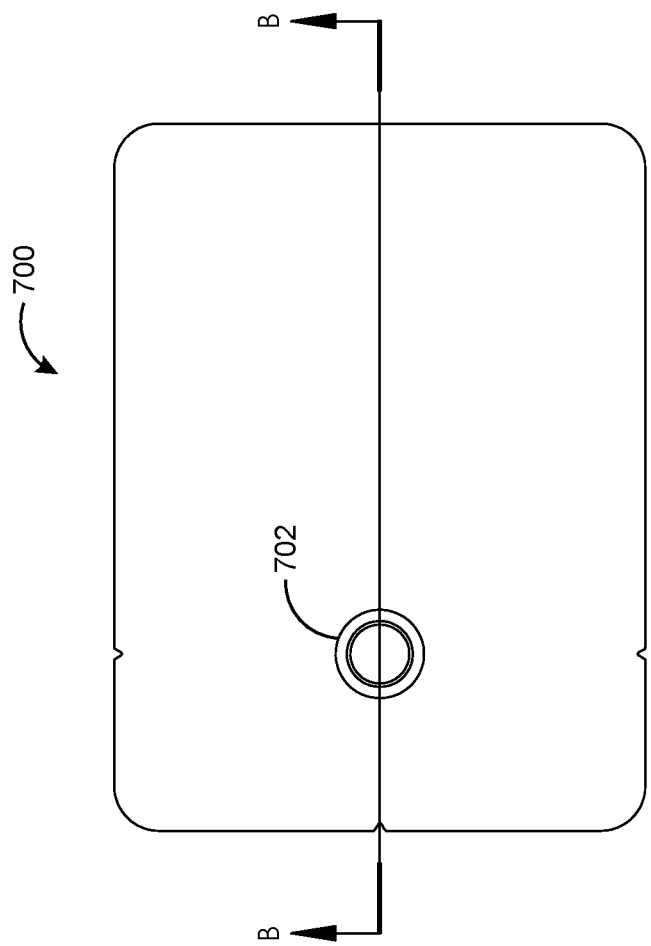
FIG. 13 B1

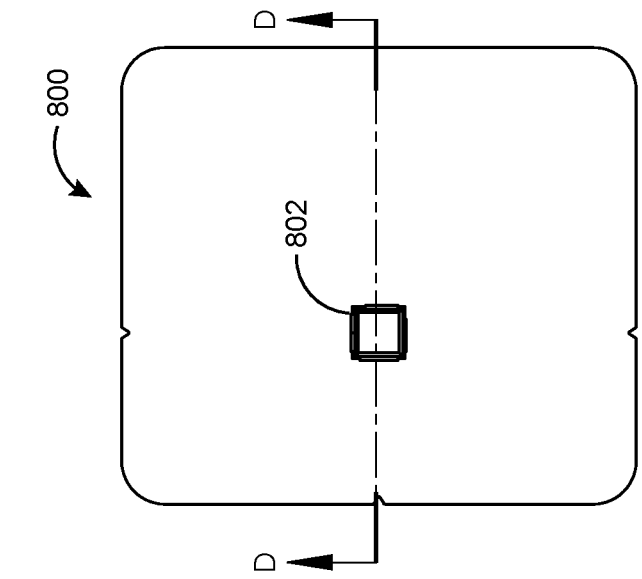
FIG. 14 B2
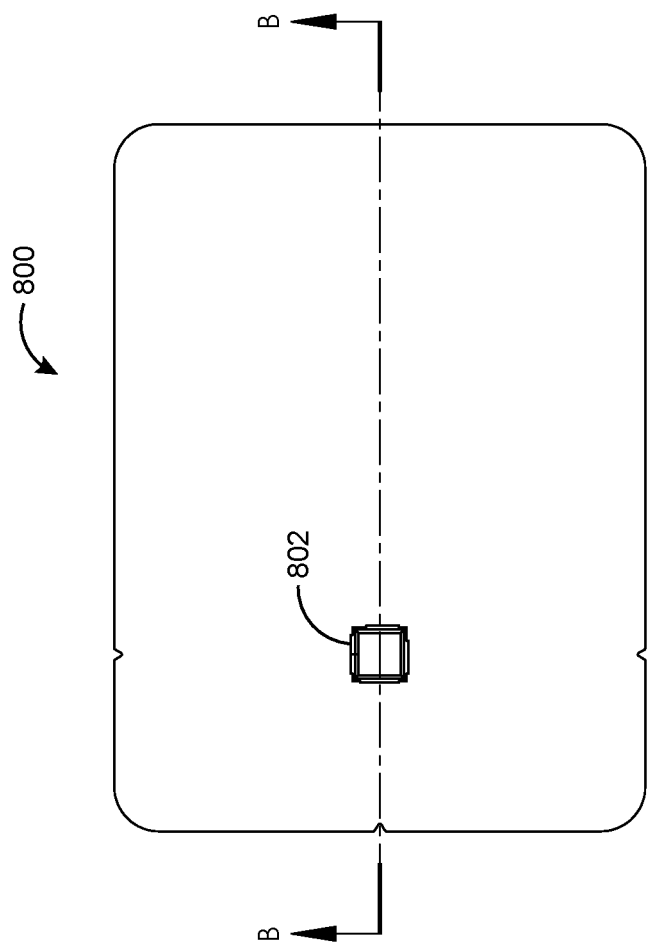
FIG. 14 B1

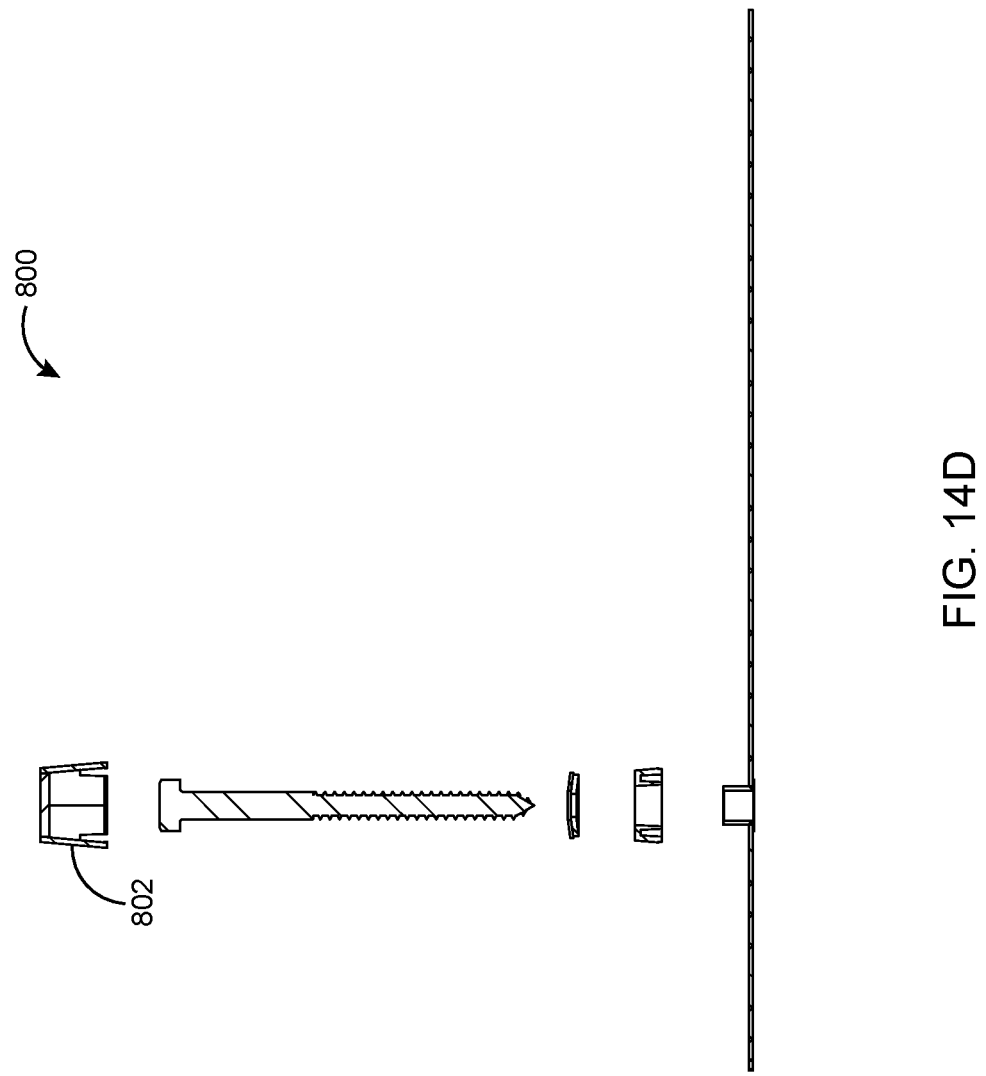

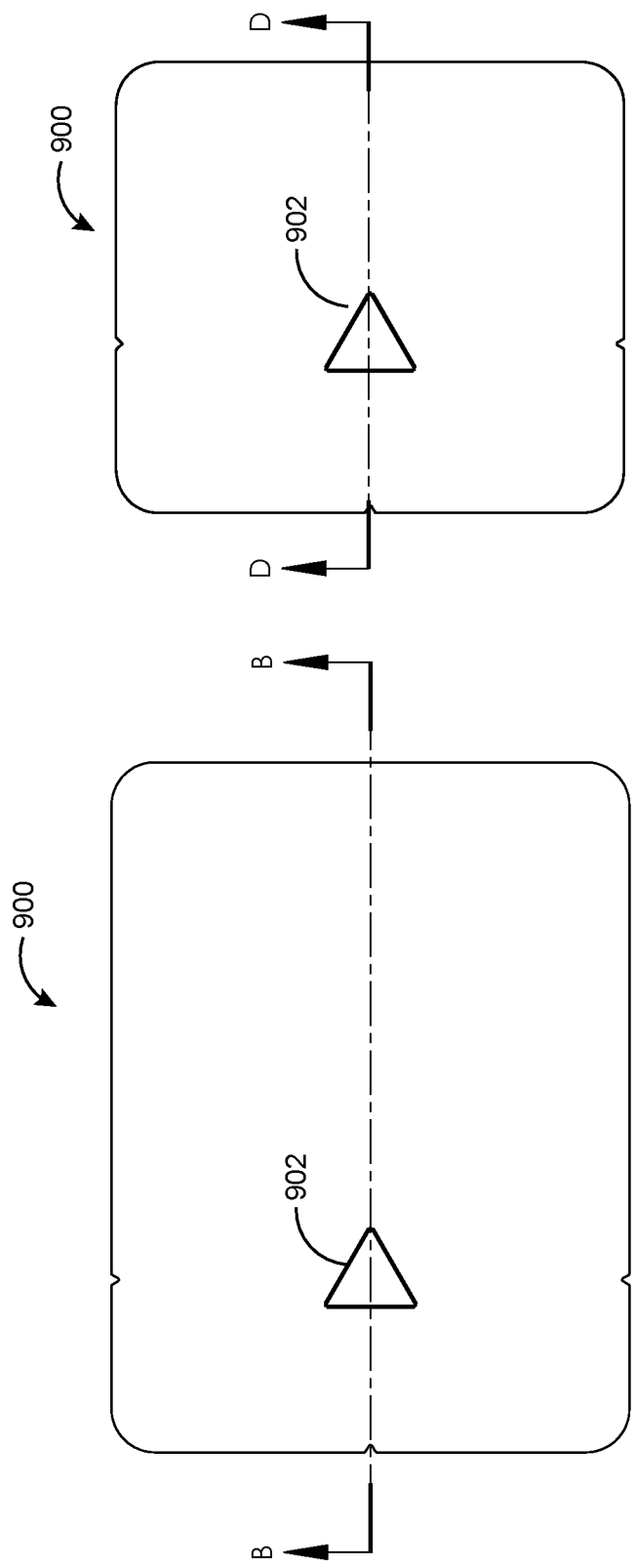
FIG. 15 B2
FIG. 15 B1

RACK READY ROOF MOUNTS

RELATED APPLICATIONS

This application is a 35 U.S.C. 371 National State Entry of International Application No. PCT/US2020/022486, filed Mar. 12, 2020, and which claims the benefit of U.S. Provisional Patent Application 62/817,535, filed Mar. 12, 2019, each of which is incorporated herein by reference in its entirety for all purposes as if fully set forth.

BACKGROUND OF THE DISCLOSURE

Technical Field of the Disclosure

The present invention generally relates to roof mounting systems and more specifically to a roof mounting system and a method for configuring a solar-rack-ready roof at the time of roofing shingle installation.

Description of the Related Art

Renewable energy producing industries and technologies are emerging rapidly to manage the day to day energy needs of human life. In recent years, the solar industry for generating electricity has increased among other traditional energy producing resources. The solar energy industry is premised on the fact that as compared to conventional power sources, solar energy acts as an alternate energy source and a standby for domestic power storage and supply to residential homes and commercial buildings. Typically, solar panels have an outer tempered glass covering, photovoltaic cells with electrical connectors, a plastic or metal back plate, a metal perimeter frame attached to the tempered glass and back plate, weatherproof electric interconnecting panel cables, among other components, and they are typically mounted on metal support racks that are anchored to a roof or other surface. With the increased use of roof mounted photovoltaic (PV) systems for generating electricity, demand has been increased for mounting hardware, which attaches frames for the purpose of installing the PV modules to the roof structure. However, the solar installer must have the required knowledge, training, and skills to be able to install the solar array on a rooftop according to roofing codes, standards and best practices without causing some damage to the roofing materials.

Yet another conventional method describes the solar systems being installed at the time of building construction. Presently, a viable option for installation of the roof structure being "solar ready", that is, ready for solar but without solar racking or PV systems in place has not been introduced, likely due to high installation expenditures. Such a solution could provide a building developer or a new construction homeowner with a low-cost entry point to a potential future solar system, but without requiring a full investment up front.

Solar "mounts" or "mounting brackets" are the connecting interface between the solar racking and the building roof structure. Much of the labor time involved with installing PV systems is time spent installing the solar mounts on the rooftop. Further, when the roofing shingles are older and more susceptible to damage, crack and deformation due to cold or hot temperatures, new challenges are presented to the installers. With very high temperatures the shingles can become relatively soft, thus installers walking on the shingles at temperatures above the recommended range can cause severe deformation of the shingles and in extreme cases can completely eliminate the shingles capacity to shed water. When temperatures are too cold, the shingles can become brittle and the surface granules adhesion to the shingles becomes weakened, both of which may result in water infiltration through the roofing thereby causing severe damage to the building. To overcome these issues the shingles should be in full thickness, integrity, with optimum adhesion to each other, not too hot nor too cold, and must still retain their protective layer of the surface granules. These risks are well known in the solar industry, and the more work that must be performed, the more a roof's age becomes a factor.

Another shortcoming of prior art mounting assemblies is that they are often installed within, around and through existing roof shingles, referred to as a "retrofit", where the roofing shingles are separated and flashings are then slid up between the shingles in an attempt to maintain the waterproofing integrity of the roof. This involves "breaking" the adhered seal tabs between shingles, removing nails, and introducing the new flashings to a roof that was installed earlier. The breaking of the adhered seal tabs can have significant detrimental effects, especially when the shingles/seal tabs are too old. However, the pressure on the installer to quickly complete the installation often results in mount installations that do not address the damage to seal tabs. Moreover, when damage does occur, it can often require the disassembly, roof repair, and reassembly of the rack thereby leading to still more wear and tear. The end result being water infiltration through the roof.

Therefore, there is a need for a system for mounting solar panels roof attachments/mounts/mounting hardware on a roof the installation of the roof itself, thereby providing a cost-effective and minimal installation process. Such a system would reduce the up-front cost of the components during installation and would maintain the aesthetic quality of a solar ready roof through the use of small and low-profile mounts that can be color matched to the roofing. Further, such a system is designed to secure the solar panel with various dimensions. Such a system would eliminate the water infiltration through the roofing and into the structure of the building thereby safeguarding the building from wear and tear. Further, such a system would provide a solution to minimize the risk of roof rafter damage and also the pressure on the installer to quickly complete the installation process without causing damage to the roof mounts. The system would also reduce the future time spent on racking installation. The present embodiment overcomes shortcomings in the field by accomplishing these critical objectives.

SUMMARY OF THE INVENTION

To minimize the limitations found in the prior art, and to minimize other limitations that will be apparent upon the reading of the specification, the present disclosure provides a roof mount related system and method of mounting solar panels and a method for configuring a solar-rack-ready roof at the time of roofing shingle installation. The present invention comprises a roof structure, at least one roof mount apparatus and at least one solar panel. The at least one roof mount apparatus includes at least one flashing, at least one flashing projection, at least one fastener, a block member, a seal member and a cap member. The at least one flashing includes a flashing top surface and a flashing bottom surface. The at least one flashing projection comprising a projection aperture which is positioned at the at least one flashing. The at least one fastener connects the at least one flashing with the roof structure. The at least one fastener is preferably threaded, but may be unthreaded or may include a threaded portion and a non-threaded portion.

The block member of the preferred embodiment is coupled to the at least one flashing projection. The seal member has a first portion and a second portion each have an aperture to receive the at least one fastener, which passes through it. The cap member of the preferred embodiment is installed over the at least one fastener and the block member. The cap member includes a locking mechanism adaptable to couple the cap member to the block member. At any time thereafter, the cap, the screw, and block may be removed, and solar panels or solar panel racking equipment may be installed on the roof mount apparatus. The at least one roof mount apparatus allows the at least one solar panel to be mounted onto the roof structure with the seal member, thereby providing a water-tight securement and reducing wear and tear on the roof shingles and the roof structure. The at least one flashing bottom surface is installed adjacent the roof structure. In the preferred embodiment, the at least one flashing projection extends upward from the roof structure. The at least one flashing projection is cylindrical and is an integral part of the at least one flashing. Alternate embodiments include projections that are not cylindrical including conical, frustoconical, dome shaped, convex, pyramidal, having straight curved or stepped sides. Finally, in the preferred embodiment, the projection aperture is substantially centered on the at least one flashing projection, but other non-centered embodiments are also described.

In the preferred embodiment, the at least one flashing projection is centered horizontally and offset vertically toward the roof lower portion. The seal member first portion has a first seal aperture and the seal member second portion has a second seal aperture. In some embodiments the seal member may be a single part sealing washer, or a two part sealing washer, in either case polymeric or rigid. The seal first portion may be a compressible polymeric type material defining the first seal aperture. The seal second portion may be a washer material defining the second seal aperture. When installing the at least one roof mount apparatus, the projection aperture, the first seal aperture and the second seal aperture remain concentrically aligned.

In the preferred embodiment, a method for mounting at least one roof mount system, the method includes providing a roof structure, providing at least one roof mount apparatus having at least one flashing, at least one flashing projection, at least one fastener, a block member, a seal member and a cap member, providing at least one solar panel, positioning at least one flashing on the roof structure, extending the at least one fastener through the seal member to secure the block member and the seal member to the at least one flashing projection, the at least one flashing member and in turn into the roof structure, positioning the cap member on the block member and inhibiting the fluid flow through the projection aperture, the first seal aperture and the second seal aperture. At any time thereafter, the cap member may be removed along with the block and the fastener, and in its place solar racking or solar panels may be installed.

It is a first objective of the present invention to provide a roof mounting apparatus on the roof structure at the time of roofing installation thereby allowing a roof to be truly "solar ready" at the time of building construction or roof replacement.

A second objective of the present invention is to reduce the up-front cost of the components during the installation of solar roof mounting assemblies.

A third objective of the present invention is to provide an aesthetic quality of a solar ready roof through the use of small and low-profile mounts that may be color matched to the roofing, thereby making the overall appearance of the solar ready roof practically indistinguishable from other roofs.

A fourth objective of the present invention is to reduce construction expenses of solar roofing, time pressures on installers, and damage to roofs during installation.

A fifth objective of the present invention is to eliminate the need to disrupt the integrity of the existing roofing system, and also integrate the flashing and mount into the roofing materials during installation by qualified roofing professionals.

A further objective of the invention is to provide the roof mount system that is designed to secure solar panels of various dimensions.

A further objective of the invention is to provide the solar roof mount system with proper code compliant installation of the roof integrated mounting hardware while minimizing aesthetically undesirable features to the roof.

A still further objective of the invention is to minimize the time spent on the roof by solar installers when the roofing is of an advanced age and/or more vulnerable to damage, when the installer is under time pressure, or when the installer may not have the knowledge, skills or training to know when and how to install mounts without causing roof damage.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIG. 4A shows an exploded view of the at least one roof mount apparatus with the plurality of flanges in the cap member according to the preferred embodiment of the present invention;

FIGS. 8B1 and 8B2 show side views of the at least one roof mount apparatus of FIG. 8 in accordance with an alternate embodiment of the present invention;

FIG. 8D shows an exploded view of an alternate embodiment of the at least one roof mount apparatus taken along lines D-D of FIG. 8B2 illustrating the circular cap member of the present invention;

FIGS. 9B1 and 9B2 show side views of the at least one roof mount apparatus of FIG. 9 in accordance with an alternate embodiment of the present invention;

FIGS. 10B1 and 10B2 show side views of the at least one roof mount apparatus of FIG. 10 in accordance with an alternate embodiment of the present invention;

FIG. 11 shows a top perspective view of an alternate embodiment of the at least one roof mount apparatus illustrating a circular cap member with the plurality of flanges in accordance with the alternate embodiment of the present invention;

FIGS. 11B1 and 11B2 show side views of the at least one roof mount apparatus of FIG. 11 in accordance with an alternate embodiment of the present invention;

FIGS. 12B1 and 12B2 show side views of the at least one roof mount apparatus of FIG. 12 in accordance with an alternate embodiment of the present invention;

FIG. 12D shows an exploded view of an alternate embodiment least one roof mount apparatus taken along lines D-D of FIG. 12B2 illustrating the hexagonal cap member of the present invention;

FIGS. 13B1 and 13B2 show side views of the at least one roof mount apparatus in accordance with an alternate embodiment of the present invention;

FIGS. 14B1 and 14B2 show side views of the at least one roof mount apparatus in accordance with an alternate embodiment of the present invention;

FIG. 14D illustrates the square cap member with flanges of the at least one roof mount apparatus showing an exploded view of the at least one roof mount apparatus taken along lines D-D of FIG. 14B2 in accordance with an alternate embodiment of the present invention;

FIGS. 15B1 and 15B2 show side views of the at least one roof mount apparatus in accordance with an alternate embodiment of the present invention;

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term "about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

The present invention relates to a roof mounting related system 10 and method for mounting at least one solar panel 16 and other objects and a method for configuring a roof to be solar-rack-ready at the time of roofing shingle installation. In some embodiments, the present invention relates to an array of n×m apparatuses as described above and wherein n and/or m is >1.

Figure 1:
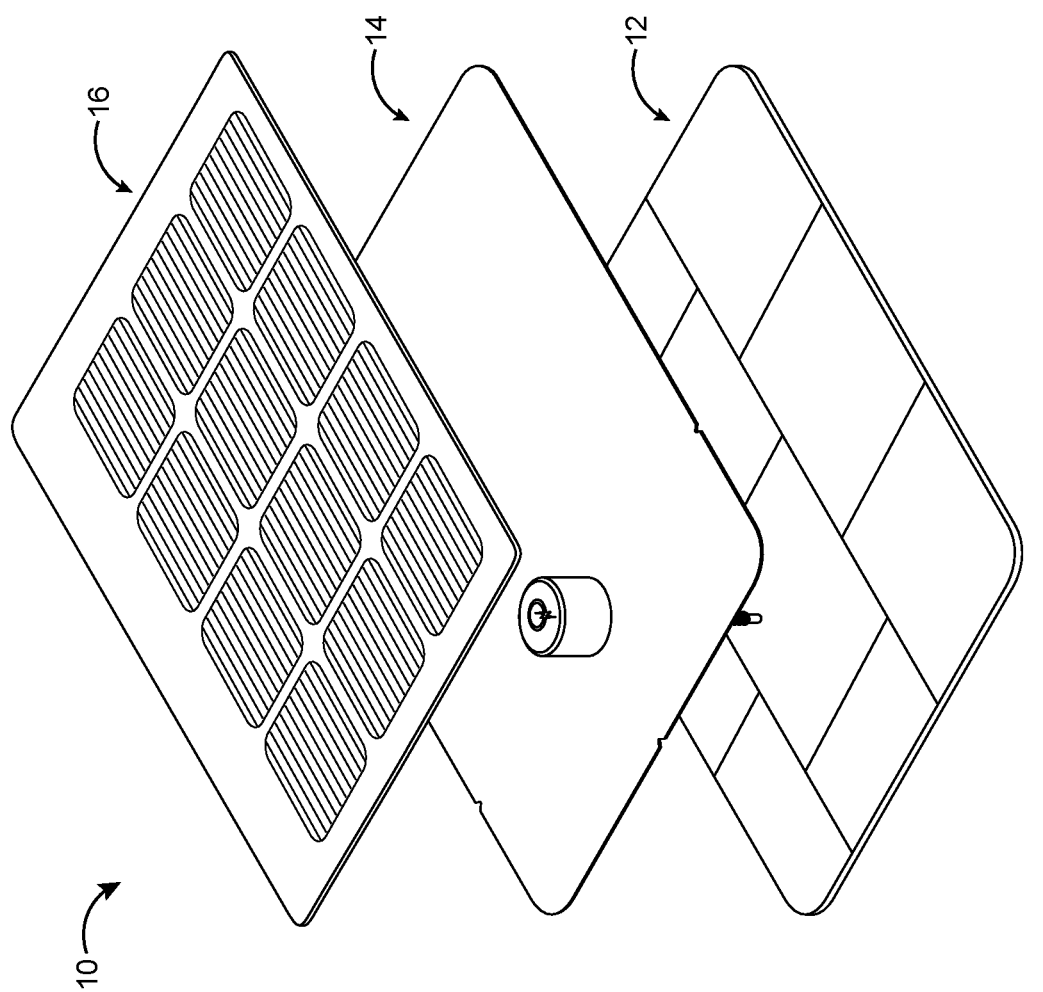
FIG. 1 shows a top perspective view of a roof mount system illustrating at least one roof mount apparatus being mounted on between a roof structure and at least one solar panel according to the preferred embodiment of the present invention.
Figure 2:
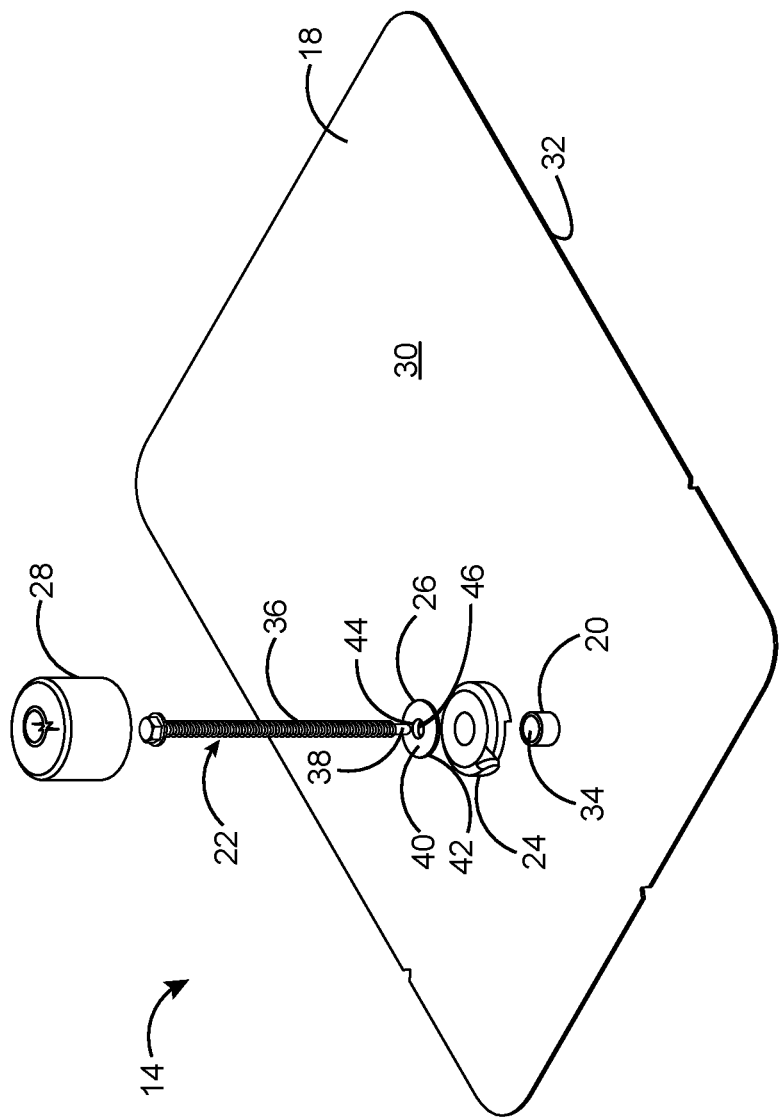
FIG. 2 shows an exploded view of the at least one roof mount apparatus according to the preferred embodiment of the present invention.
Figure 6:
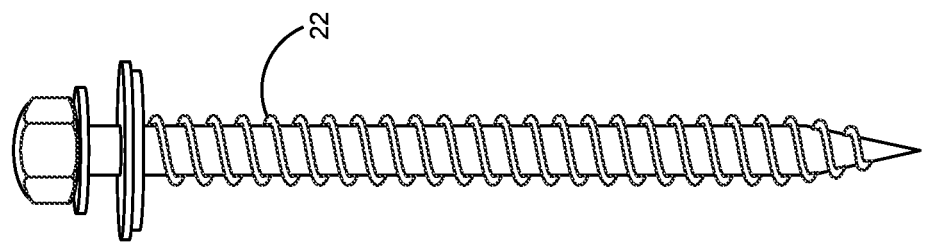
FIG. 6 shows a side view of multiple types of at least one fastener according to various alternative embodiments of the present invention.
Figure 6:
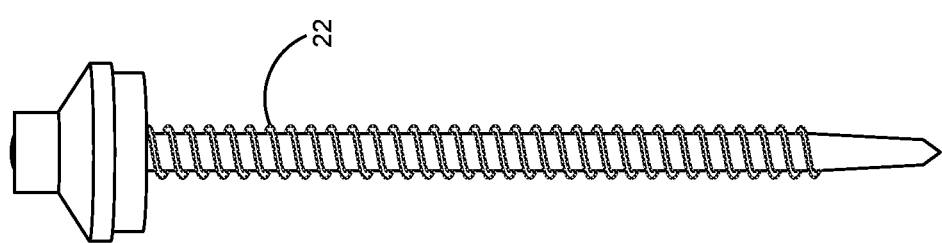
Figure 6:
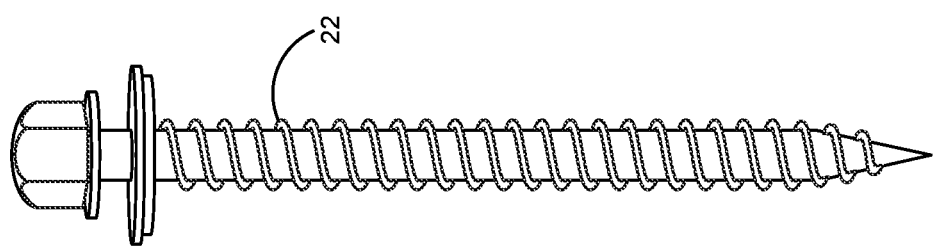

In the preferred embodiment, as shown in FIG. 1, the roof mount system 10 comprises a roof structure 12, at least one roof mount apparatus 14 and at least one solar panel 16. As shown in FIG. 2 the at least one roof mount apparatus 14 includes at least one flashing 18, at least one flashing projection 20, at least one fastener 22, a block member 24, a seal member 26 and a cap member 28. The at least one flashing 18 includes a flashing top surface 30 and a flashing bottom surface 32 that once installed is adjacent the roof surface (not shown). The flashing top surface 30 is substantially flat and the flashing bottom surface 32 that is opposite to the flashing top surface 30 and is adjacent or proximate to the roof structure 12. The at least one flashing projection 20 having a projection aperture 34 positioned at the at least one flashing 18. The at least one fastener 22 is designed in such a way to connect the at least one flashing 18 with the roof structure 12. The at least one fastener 22 includes a threaded portion 36 and a non-threaded portion 38 as shown in FIG. 6.

Figure 5:
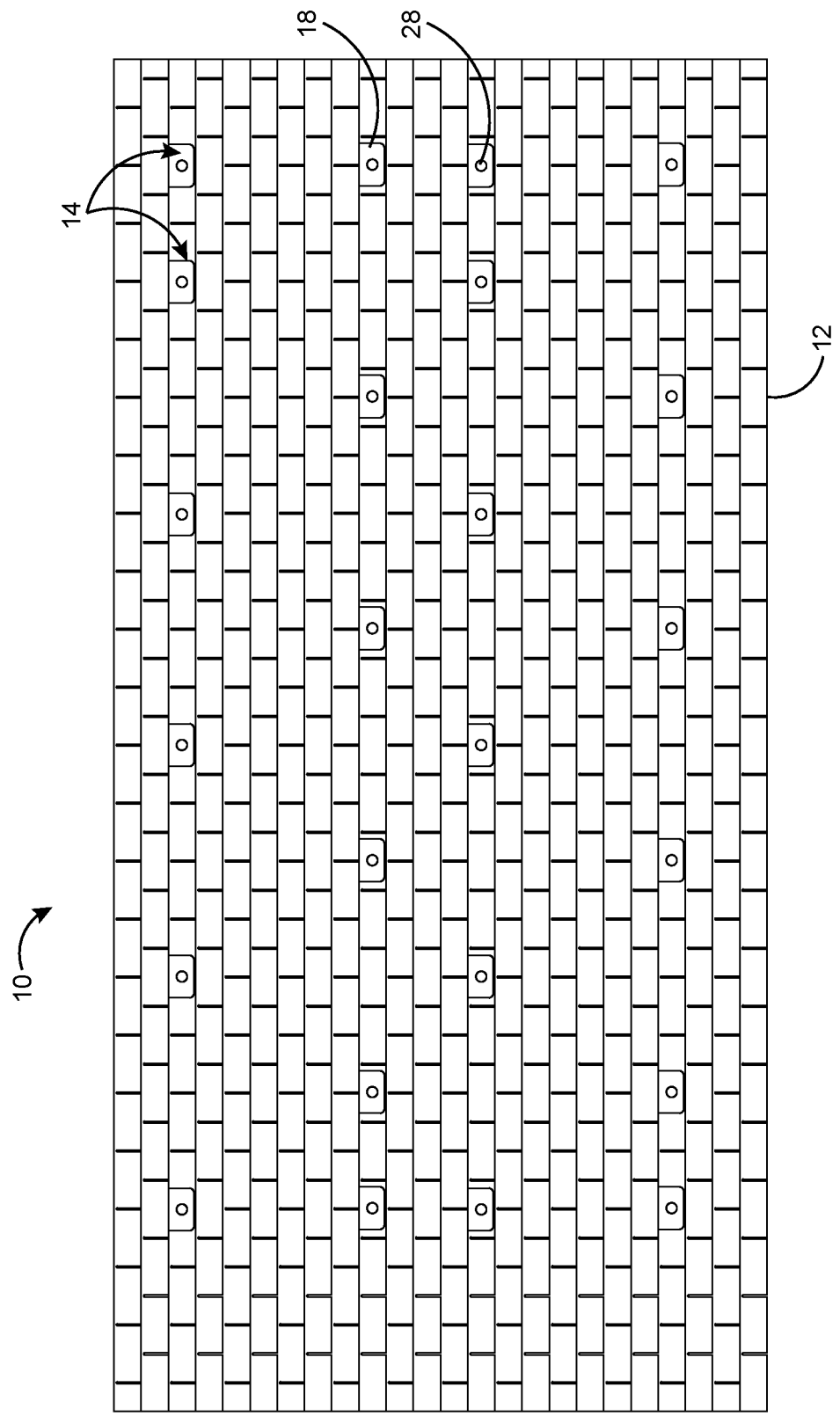
FIG. 5 illustrates a plan view of a roof showing a plurality of roof mount apparatus assembled on a roof structure according to the preferred embodiment of the present invention.

Although in FIG. 2 only a single roof mount system 10 is shown, a plurality of roof mount systems may be positioned on a single roof structure 12 as shown in FIG. 5. Moreover, the roof mount system 10 may be utilized with a variety of roof types, such as composition shingle, metal shingle, slate roofs, shake roofs, tile roofs, membrane roofs, and the like. For reference, as shown in FIG. 5, the upper portion of the roof 110 is typically farther from a ground surface (not shown) than the lower portion of the roof 112.

Figure 16A:
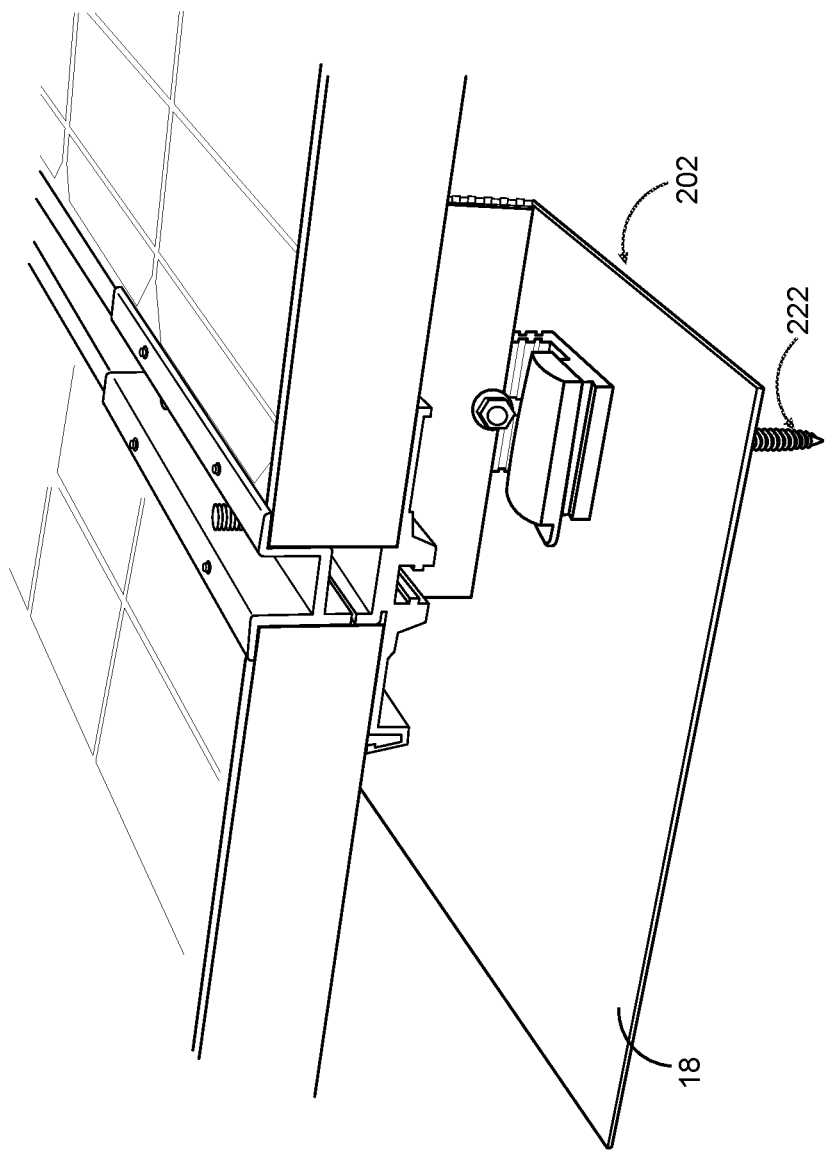
FIG. 16A shows a first example of a solar panel and racking system installed on a roof structure.
Figure 16B:
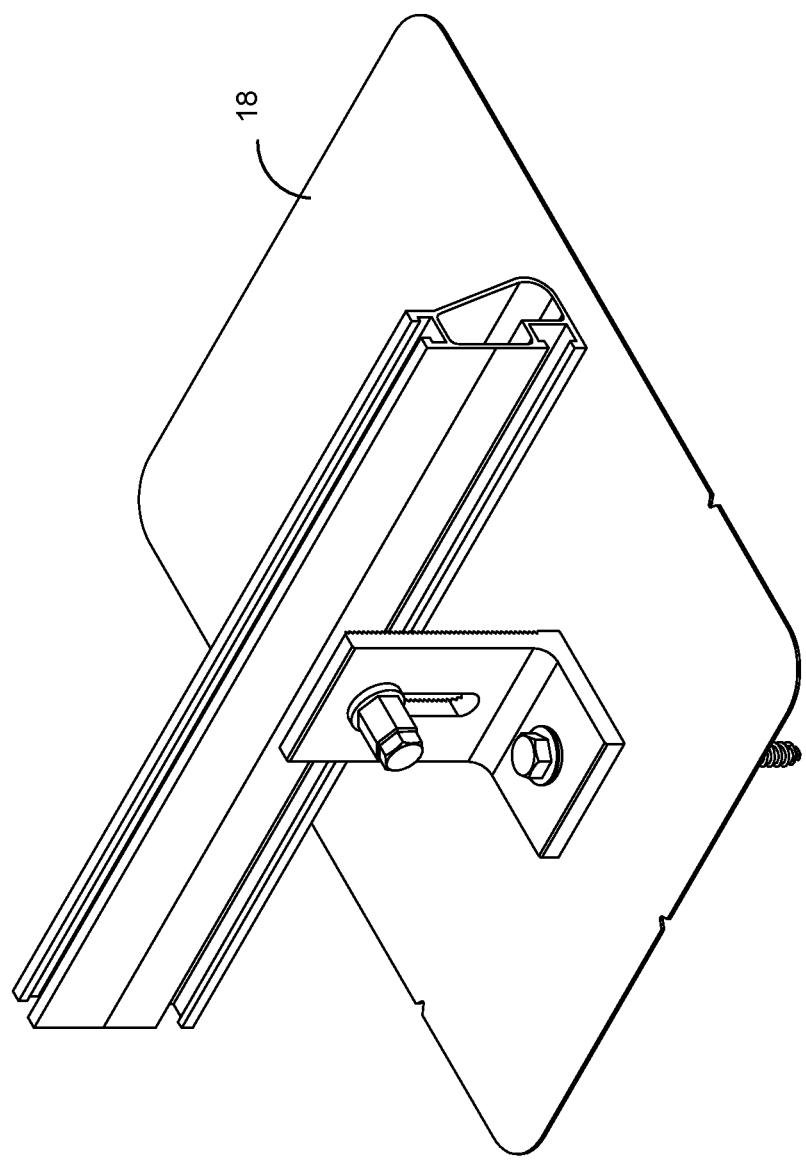
FIG. 16B shows a second example of a solar panel and racking system installed on a roof structure.

The block member 24 of the preferred embodiment is coupled to the at least one flashing projection 20. The block member 24 comprises a block member aperture 25 which surrounds flashing projection 20. The seal member 26 including a first portion 40 and a second portion 42 (not shown) receives the at least one fastener 22, which passes through it. The cap member 28 of the preferred embodiment is installed over the at least one fastener 22 and the block member 24. The cap member 28 includes a locking mechanism adaptable to couple the cap member 28 to the block member 24. In practice, the cap member 28 obstructs, or otherwise blocks or prevents the fitting of rack mounting brackets or solar panels to the projection 42 until the cap is removed. Once removed, the solar panel or racking materials may be installed as shown at FIGS. 16A and 16B, discussed in additional detail later.

In the preferred embodiment, at any time the cap member 24 and optionally the fastener 22 and the block member 24 may be removed such that at least one roof mount apparatus 14 allows the at least one solar panel 16 to be mounted onto the roof structure 12 with the seal member 26. The system provides a water-tight securement and reduces wear and tear on a roof shingle and the roof structure 12. As shown in FIG. 2, the at least one flashing 18 is preferably substantially rectangular in shape and with rounded corners. In other embodiments, the at least one flashing 18 may have other shapes and configurations.

As best illustrated in FIG. 2, the at least one flashing bottom surface 32 is attached to the roof structure 12 such that it is adjacent the roof surface. In the preferred embodiment, the at least one flashing projection 20 extending upward from the roof structure 12. The at least one flashing projection 20 is cylindrical and is an integral part of the at least one flashing 18. The at least one flashing projection 20 may have a number of different shapes, sizes, diameters, lengths and configurations. In embodiments where there are multiple flashing projections or multiple flashings, each of the components described herein is to be repeated for each of those multiples. The at least one flashing projection 20 comprising the projection aperture 34 is circular in the preferred embodiment, but in other embodiments the projection aperture 34 may be square, D-shaped, triangular, pentagonal, hexagonal, ovular, or other regular or irregular shapes. Also, in the preferred embodiment, the projection aperture 34 is substantially centered on the at least one flashing projection 20, but other, non-centered embodiments are also possible.

In the preferred embodiment, as shown in FIG. 2 the at least one flashing projection 20 is centered horizontally and offset toward the bottom vertically. Any other suitable orientations/configurations that may be desirable for different roof configurations are disclosed as well. For example, there are embodiments where at least one flashing projection 20 might be centered on a substantially square shaped at least one flashing 18 or other embodiments where multiple flashing projections might be either symmetrically or asymmetrically centered or offset on the at least one flashing. Still further embodiments may include at least one flashing projection 20 placed in suitable locations for matching with existing hardware.

As shown in FIG. 2, the seal member first portion 40 has a first seal aperture 44 and the seal member second portion 42 (not shown in this figure) having a second seal aperture 46 (not shown in this figure). In some embodiments the seal member 26 may be a sealing washer, and optionally a two-part sealing washer. The seal member first portion may be a compressible polymeric type material defining the first seal aperture 44, or may be a rigid sealing washer of either a single part or two-part construction. The seal member second portion (not shown) may be a washer material defining the second seal aperture (not shown). When installing the at least one roof mount apparatus 14 as well as after installation, the projection aperture 34, the first seal aperture 44, the second seal aperture (not shown), and the block member aperture 25 remain concentrically aligned. The seal member first portion 40 may be made from any suitable resilient sealing material, such as polymers, rubbers, and the like.

In the preferred embodiment, the at least one fastener 22 connects the at least one flashing 18 to the roof structure 12. In some other embodiments, the at least one fastener 22 may engage additional supporting roof structures and the like. The at least one fastener 22 may be a self-drilling screw that is sized such that it does not require a pilot drill and such that the at least one fastener 22, once removed, leaves behind what is effectively a predrill or pilot drill hole for a solar rack mounting screw, solar panel securing screw, or any other second fastener 222 to be used at a later date, effectively removing the step of predrilling at that later date. This effectively eliminates all waste from the installation and acts to increase the efficiency of the total installation process. In certain embodiments the at least one fastener 22 might be any combination of a wood screw with a self-drilling tip and sealing washer and hex flange head or driving portion, a sheet metal screw with a self-drilling tip and hex umbrella head with an EPDM seal (thick or otherwise), and/or lag screw with standard two-part sealing washer and standard hex drive hex head or other appropriately configured fastener. In certain embodiments the fastener 22 is threaded, but in certain other embodiments it is not threaded, or comprises a threaded portion and a nonthreaded portion.

As illustrated in FIG. 2, the at least one fastener 22 extends through the projection aperture 34, the first seal aperture 44 and the second seal aperture (not shown). Along its length the at least one fastener 22 comprises the threaded portion 36 and the non-threaded straight shank portion 38 (See FIG. 6), whereby the threaded portion 36 has a first diameter and the non-threaded straight shank portion 38 has a second diameter. In a preferred embodiment, the second diameter is larger than the first diameter. The first and second diameters may be sized appropriately to allow them to act as a predrill such that, once removed, a pilot hole remains and may be used during the installation of solar racking or solar panels as shown at FIGS. 16A and 16B. The referenced diameters may preferably range from $\frac{1}{8}$" to $\frac{1}{4}$" and less preferably other dimensions outside this range. The end of the threaded portion 36 of the at least one fastener 22 preferably includes a cut away portion that acts as a self-drilling tip 39. The end of the at least one fastener 22 that includes the solid cylinder or non-threaded straight shank portion 38 has a driving portion which is larger than the second diameter. As depicted in FIG. 5, various types and styles of the at least one fastener 22 may be used in various embodiments. The at least one fastener 22 secures the seal member 26, the block member 24 and the at least one flashing 18 and fixes in place on the roof structure 12 during installation.

In the preferred embodiment, the block member 24 may be cylindrical, round, square, or of another suitable shape. The at least one fastener 22 serves to couple the seal member 26, the block member 24 and the at least one flashing 18 to the roof structure 12. The cap member 28 includes a locking mechanism adaptable to couple the cap member 28 to the block member 24. The locking mechanism may be either a twist lock feature, a friction fit feature or a snap feature or the cap may have a through hole allowing a fastener and nut to connect the cap. In another embodiment, the block member 24 includes an outside perimeter having a plurality of block threads (not shown). Similarly, the cap member 28 includes an inside perimeter having a plurality of cap threads (not shown). The plurality of block threads (not shown) configured to engage with the plurality of cap threads (not shown).

Figure 3:
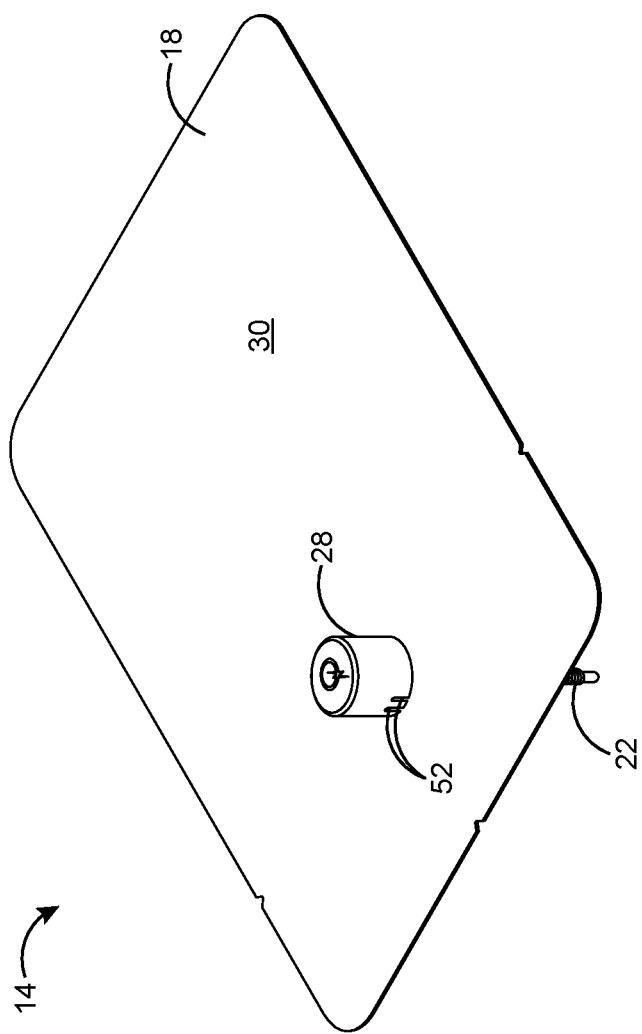
FIG. 3 shows a top perspective view of the at least one roof mount apparatus with a limited number of flanges in a cap member according to the preferred embodiment of the present invention.
Figure 3A:
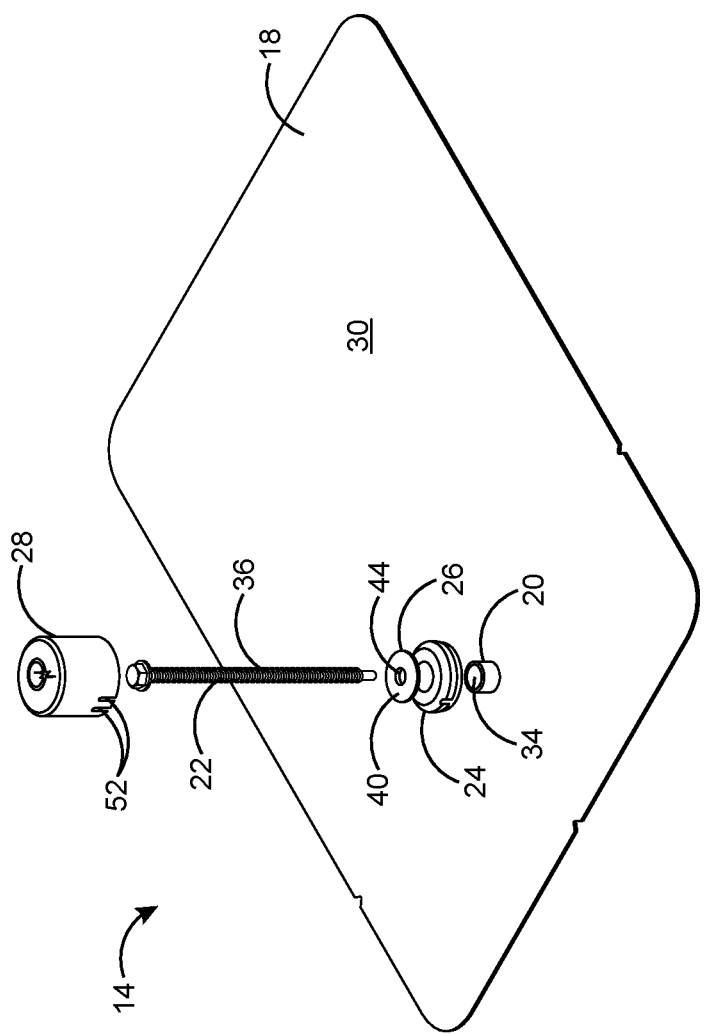
FIG. 3A shows an exploded view of the at least one roof mount apparatus with the limited number of flanges in the cap member according to the preferred embodiment of the present invention.
Figure 4:
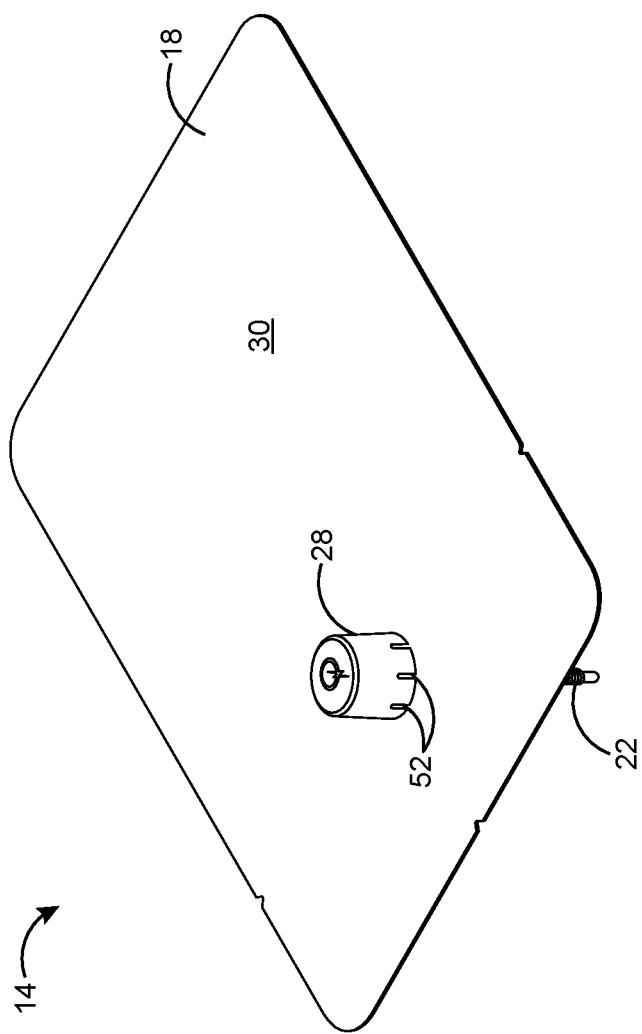
FIG. 4 shows a top perspective view of the at least one roof mount apparatus with the plurality of flanges in the cap member according to the preferred embodiment of the present invention.

In some embodiments, the block member 24 outside perimeter includes a snap socket of varying diameters along its height that in coordination with a snap stud feature on the inside perimeter of the cap member 28 act to hold the cap member 28 in place on the flashing top surface 30. In other embodiments, the snap socket is located on the inside perimeter of the cap member 28 and the snap stud is located on the block member 24. In another embodiment, the outside perimeter of the block member 24 has a mortised or cutaway feature including a vertical mortise or recessed slot and a horizontal mortise or recessed slot that in coordination with a twist lock feature or a projection on the inside perimeter of the cap member 28 which act to hold the cap member 28 in place on the flashing top surface 30. In some embodiments, the snap or twist lock couples the cap member 28 to the block member 24, the cap member 28 having an inside surface, a bottom surface and an outside surface. Generally, the cap member 28 is cylindrical and includes an elongated body portion. The cap member 28 is detachably installed over the at least one fastener 22 and the block member 24. In one embodiment, as shown in FIG. 2, the cap member 28 has an inside perimeter comprising a twist lock feature. In another embodiment, as shown in FIGS. 3 and 3A, the cap member 28 may include a snap lock feature with a limited number of flanges 52 for securing the cap member 28 to the block member 24. In yet another embodiment, as shown in FIGS. 4 and 4A, the cap member 28 includes a snap lock feature with the plurality of flanges 52 for securing the cap member 28 to the block member 24.

Figure 7:
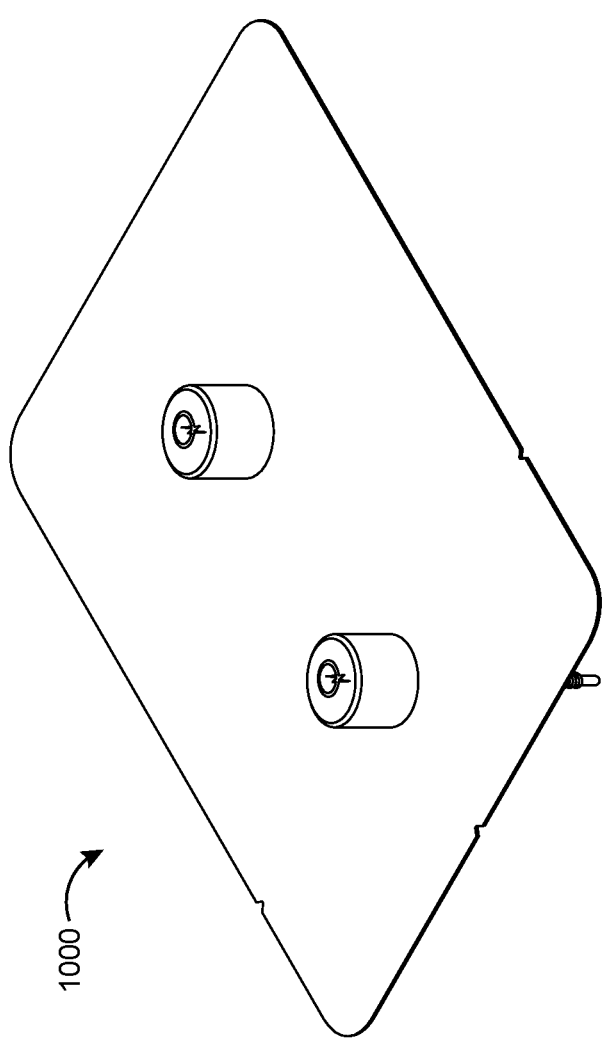
FIG. 7 shows a top perspective view of an alternative embodiment of the roof mount system having plurality of roof mount apparatus positioned on at least one flashing.

In another alternate embodiment, as shown in FIG. 5 the roof mount system 10 comprises at least one or more roof mount apparatuses 14 assembled on the roof structure 12. In one embodiment, as shown in FIG. 5, the at least one mount system may include at least two roof mount apparatuses 14. In other embodiments, the system includes more than two roof mount apparatus, or four roof mount apparatuses. In yet another alternate embodiment, as shown in FIG. 7, the roof mount system comprises a plurality of roof mount apparatuses 1000 is positioned on the at least one flashing 18. Here, the roof mount apparatus 1000 includes more than one projection 20, aperture 34, block 24, seal member 40, fastener 22, and cap 28 positioned on a single flashing 18.

The at least one roof mount apparatus 14 may be installed on the roof structure 12 and similar structures. The at least one fastener 22 extends through the at least one seal member 26, the at least one block 24, the at least one flashing 18, and into the roof structure 12, as illustrated in FIG. 3, wherein the roof structure is not shown. The seal member 26 prevents or inhibits entry of water or other fluid into the projection aperture 34 and also into to the roof structure 12.

Figure 8:
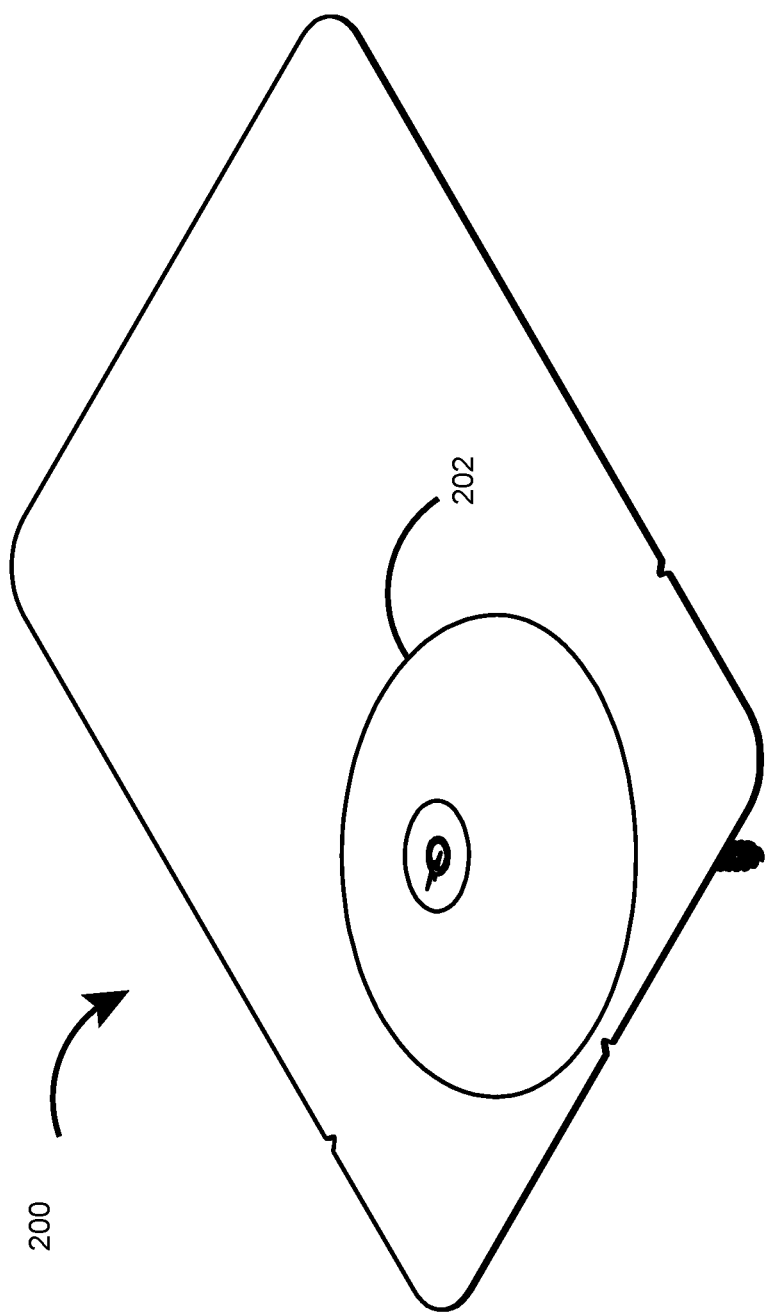
FIG. 8 shows a top perspective view of an alternate embodiment of the at least one roof mount apparatus illustrating a circular cap member in accordance with the alternate embodiment of the present invention.
Figure 8A:
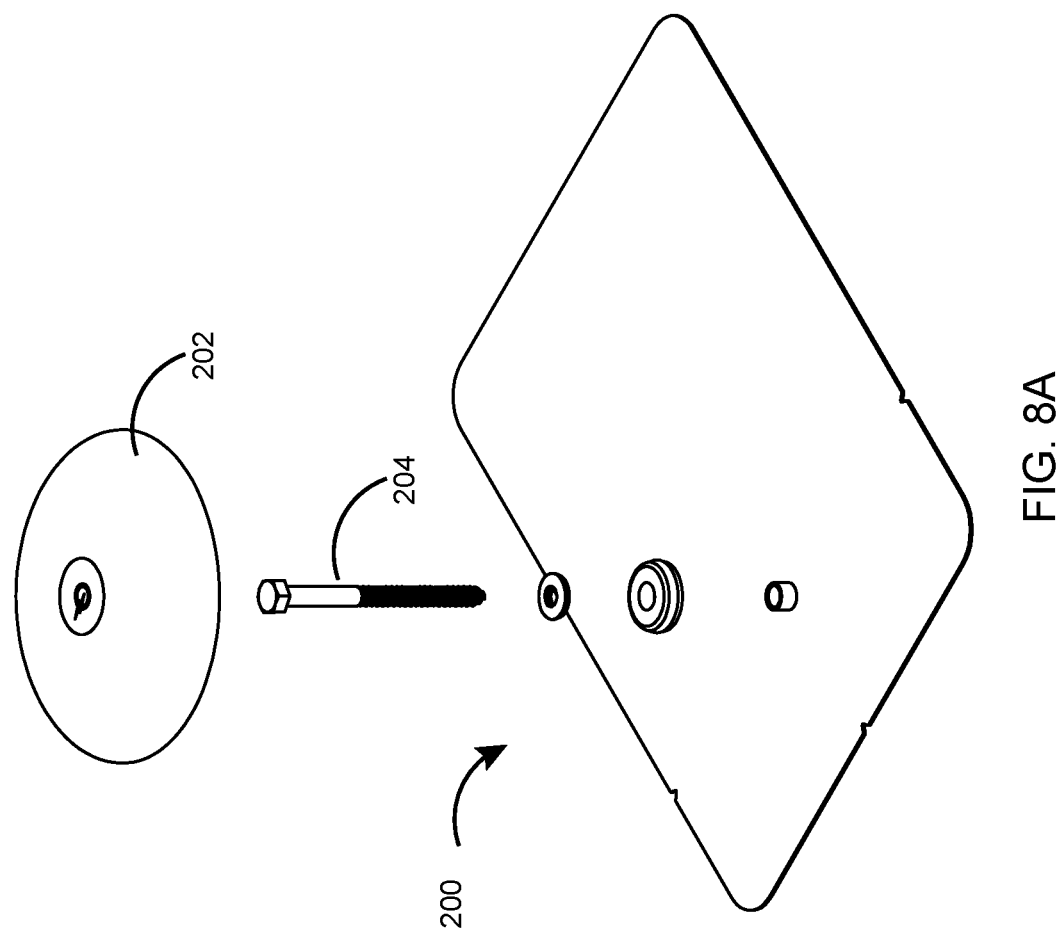
FIG. 8A shows an exploded view of the at least one roof mount apparatus illustrated in FIG. 8 in accordance with an alternate embodiment of the present invention.

FIGS. 8-8D show at least one roof mount apparatus 200 in accordance with an alternate embodiment, in which a cap member 202 is circular in shape. The cap member 202 is detachably installed over at least one fastener 204 and the block member.

Figure 8C:
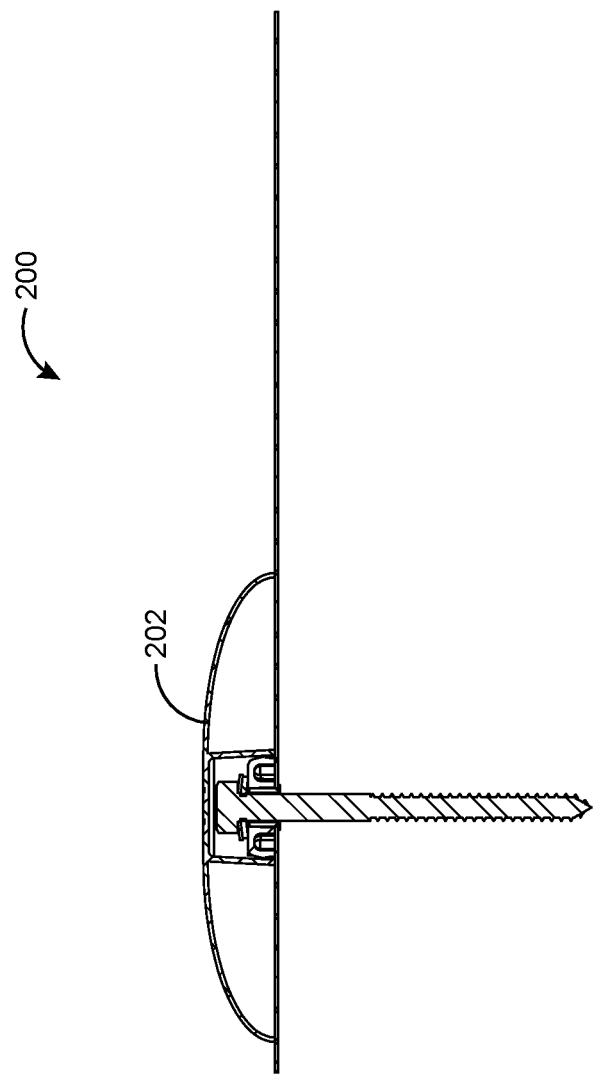
FIG. 8C shows a cross sectional view of an alternate embodiment of at least one roof mount apparatus taken along lines B-B of FIG. 8B1 illustrating the circular cap member of the present invention.
Figure 9:
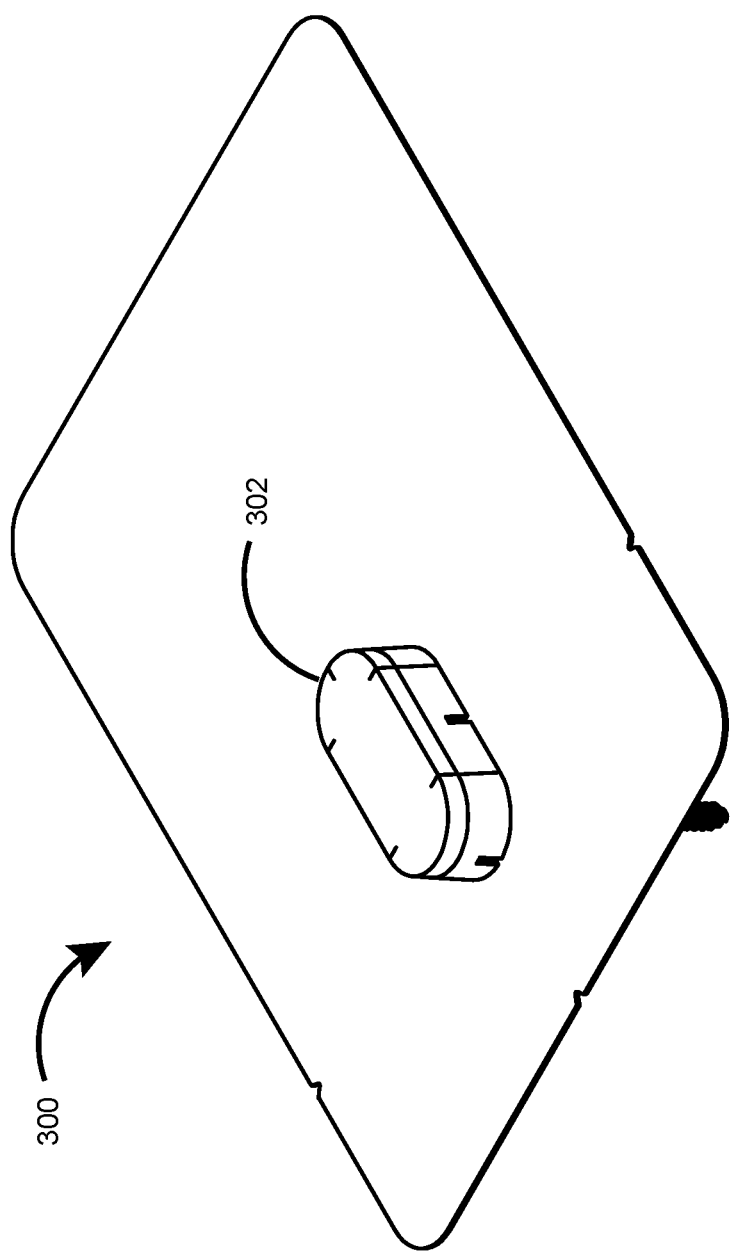
FIG. 9 shows a top perspective view of an alternate embodiment of the at least one roof mount apparatus illustrating a rounded rectangular cap member with a plurality of flanges in accordance with the alternate embodiment of the present invention.
Figure 9A:
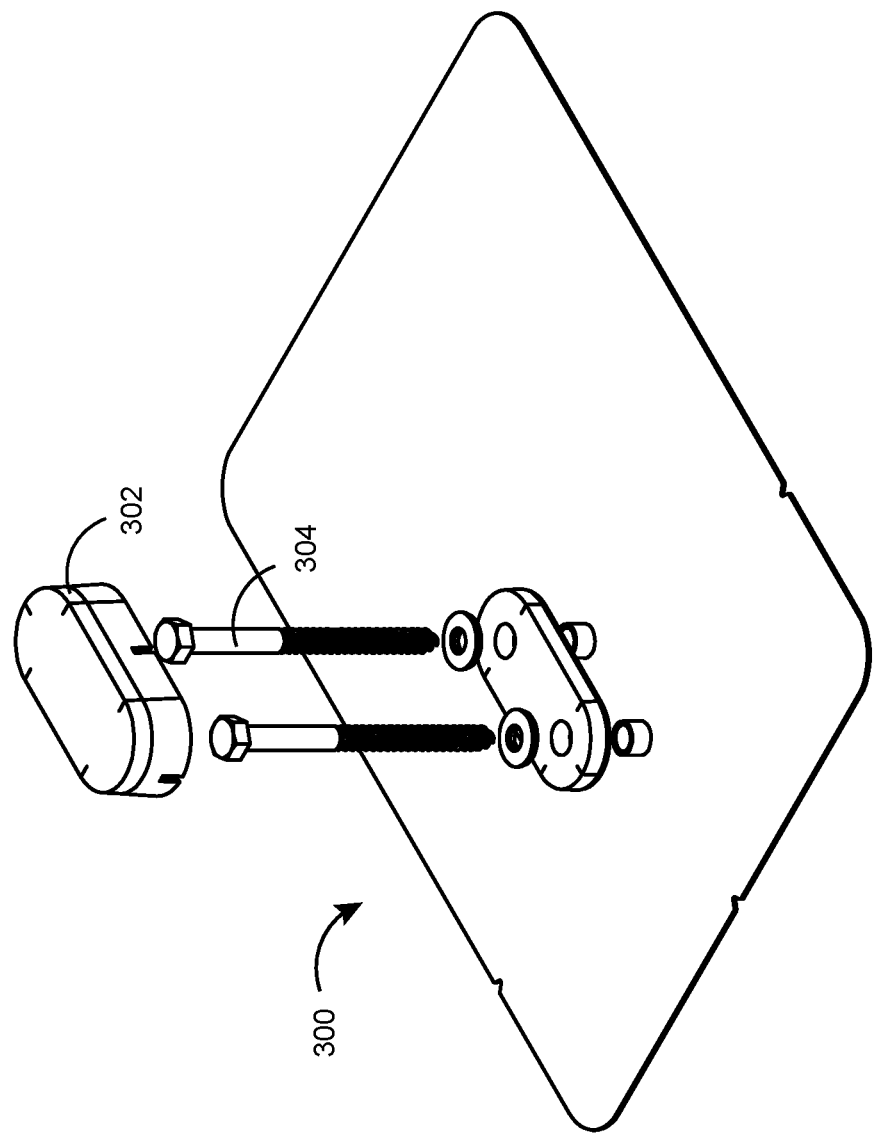
FIG. 9A shows an exploded view of an alternate embodiment of the at least one roof mount apparatus illustrated in FIG. 9 in accordance with the alternate embodiment of the present invention.
Figure 9C:
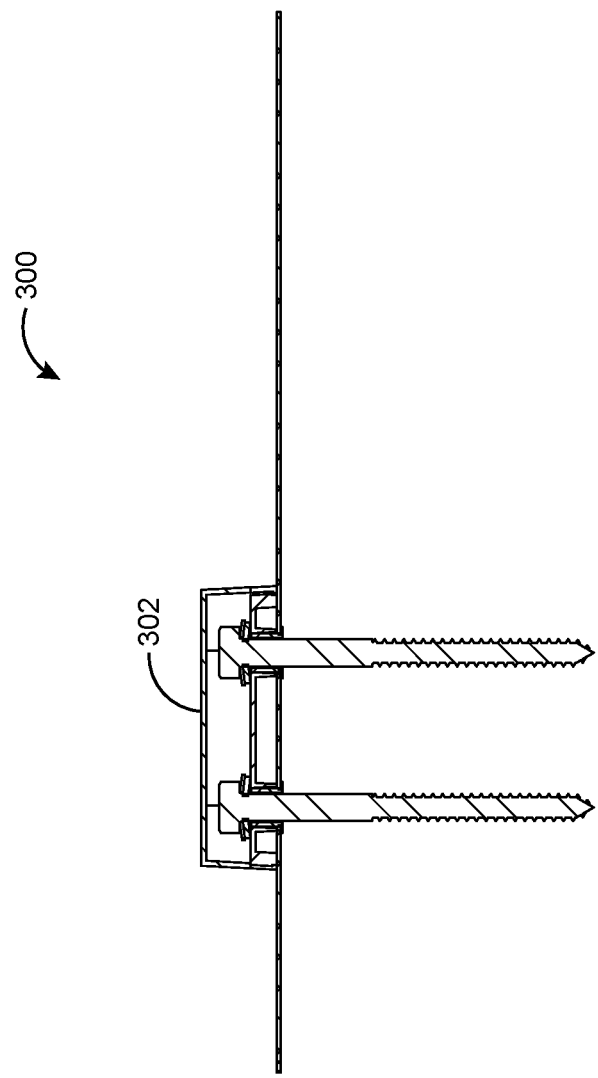
FIG. 9C shows a cross sectional view of an alternate embodiment of at least one roof mount apparatus taken along lines B-B of FIG. 9B1 illustrating the rounded rectangular cap member of the present invention.
Figure 9D:
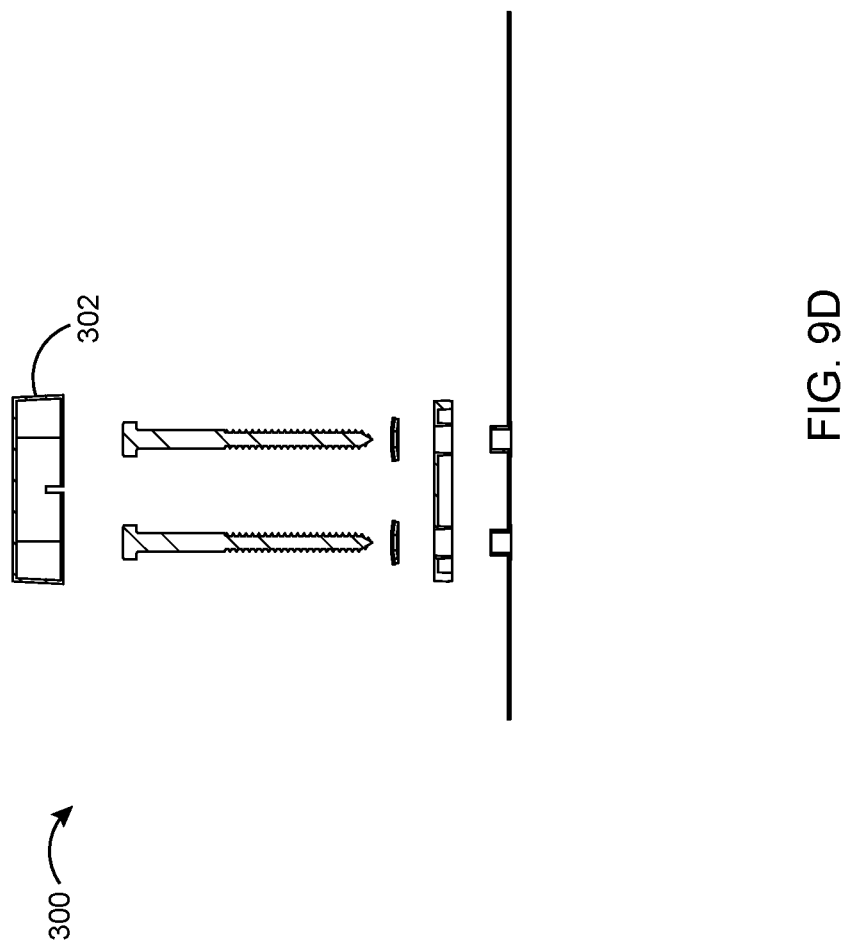
FIG. 9D shows an exploded view of an alternate embodiment of at least one roof mount apparatus taken along lines D-D of FIG. 9B2 illustrating the rounded rectangular cap member of the present invention.

FIGS. 9-9D show alternate embodiments of at least one roof mount apparatus 300, in which a cap member 302 is rounded rectangular with the plurality of flanges. The cap member 302 detachably installed over the plurality of fasteners 304 and the block member. In FIG. 8C, an alternative embodiment is shown in which the projection 20 does not extend below a bottom plane of the flashing, or is flush with the bottom plane of the flashing.

Figure 10:
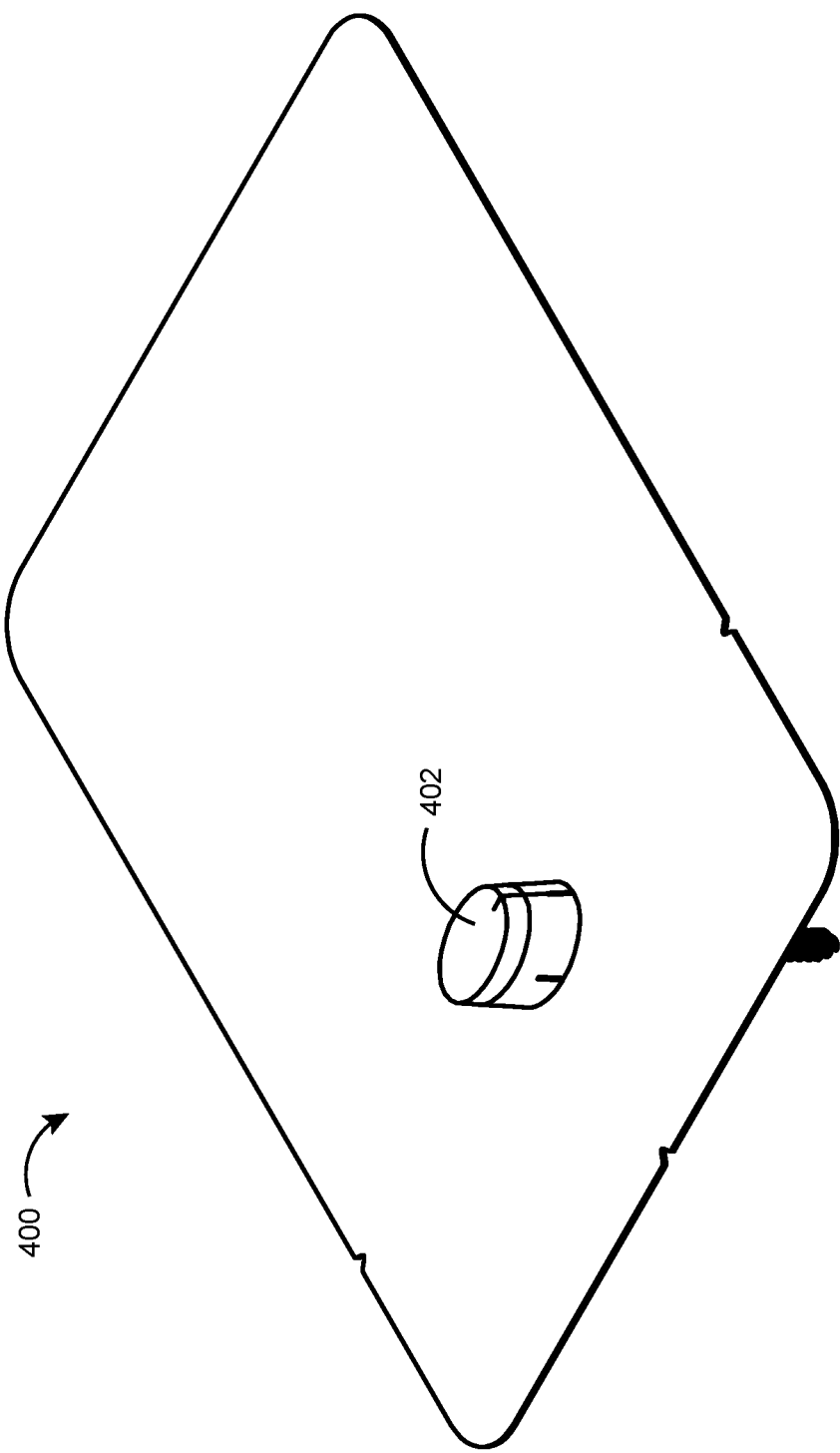
FIG. 10 shows a top perspective view of an alternate embodiment of the at least one roof mount apparatus illustrating an elliptical cap member with the plurality of flanges in accordance with the alternate embodiment of the present invention.
Figure 10A:
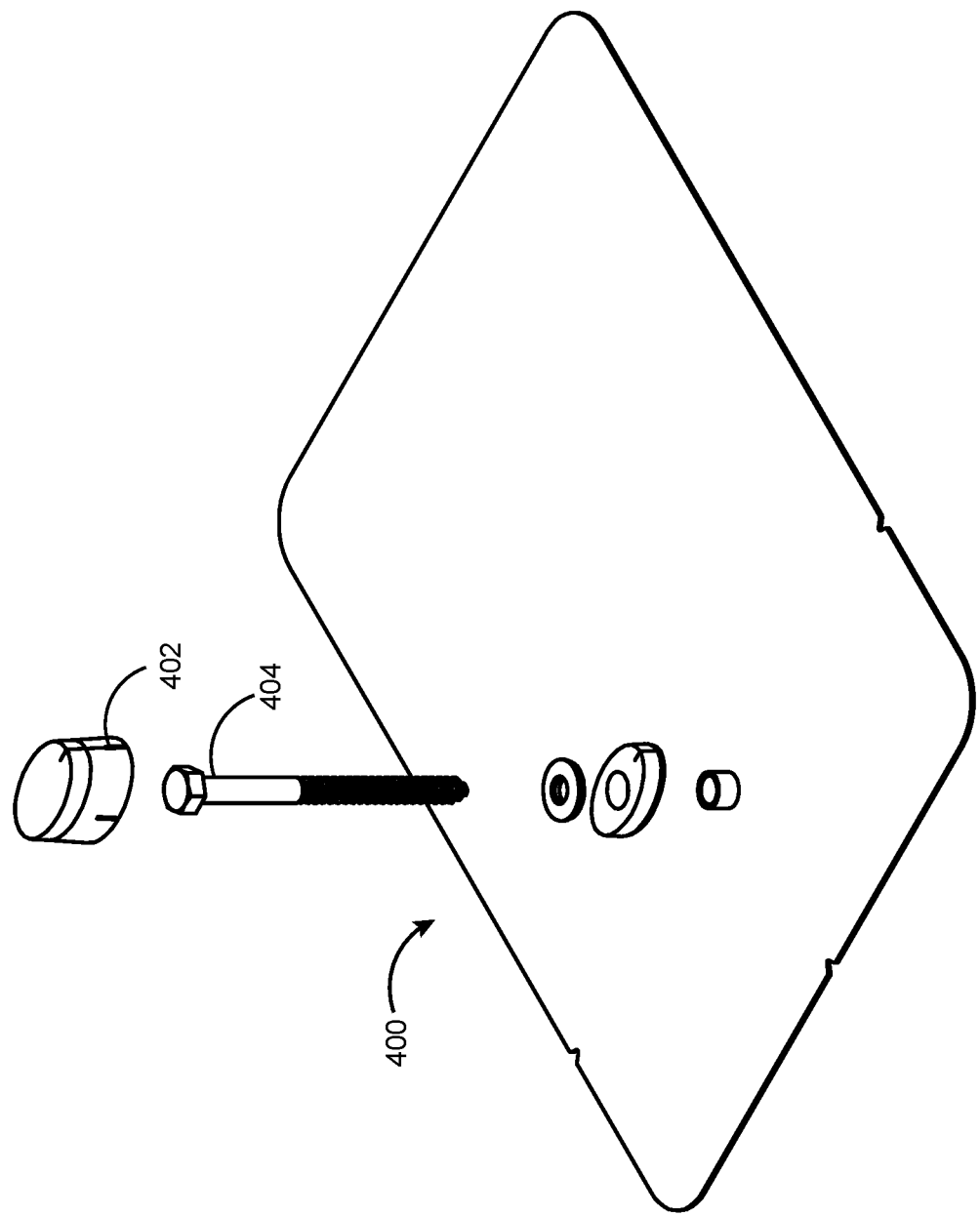
FIG. 10A shows an exploded view of an alternate embodiment of the at least one roof mount apparatus illustrated in FIG. 10 in accordance with the alternate embodiment of the present invention.
Figure 10C:
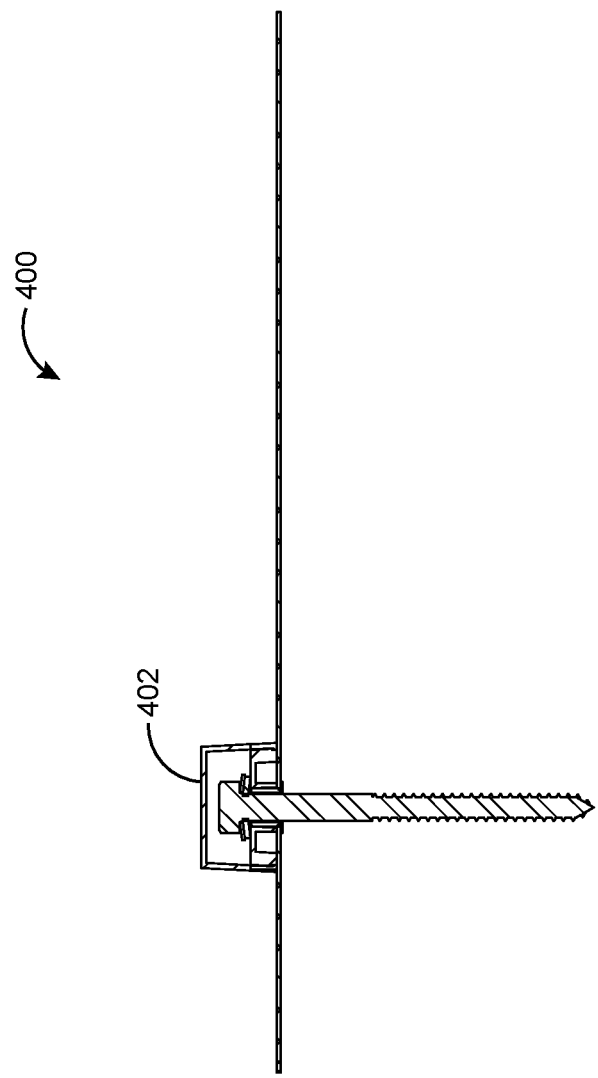
FIG. 10C shows a cross sectional view of the at least one roof mount apparatus taken along lines B-B of FIG. 10B1 in accordance with an alternate embodiment of the present invention, illustrating an elliptical cap member.
Figure 10D:
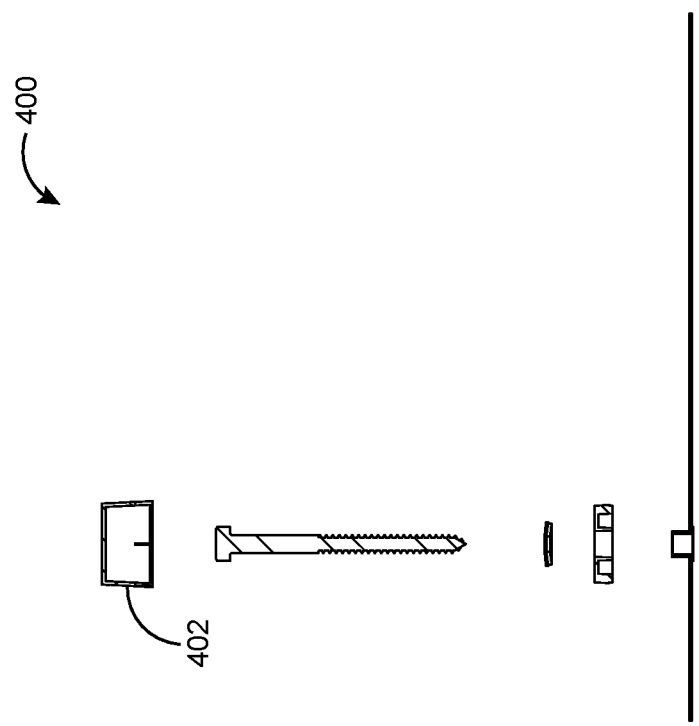
FIG. 10D shows an exploded view of an alternate embodiment of the at least one roof mount apparatus taken along lines D-D of FIG. 10B2 of the present invention illustrating an elliptical cap member.

FIGS. 10-10D show alternate embodiments of the at least one roof mount apparatus 400 of the present invention, wherein the cap member 402 is elliptical shaped with the plurality of flanges. The cap member 402 is detachably installed over at least one fastener 404 and the block member.

Figure 11A:
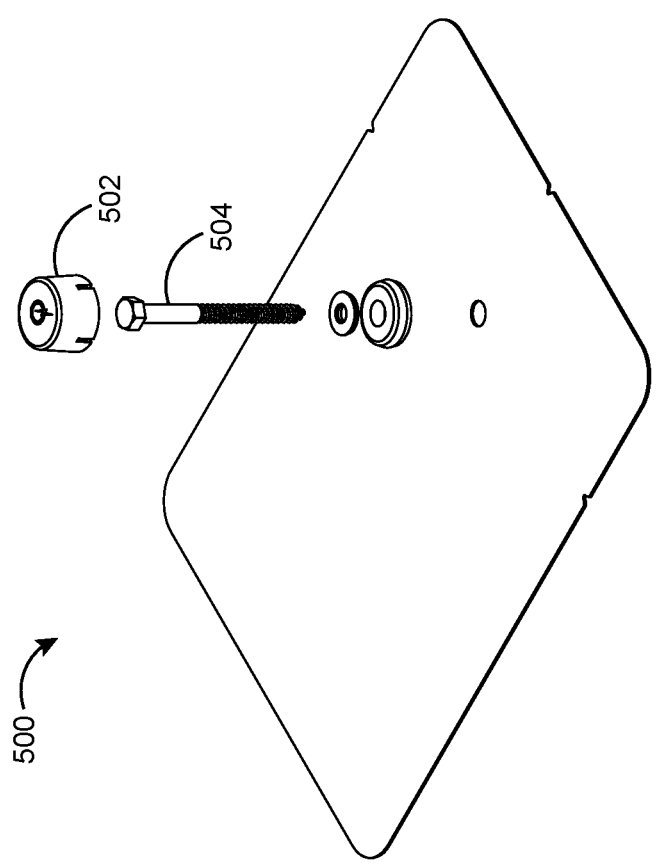
FIG. 11A shows an exploded view of an alternate embodiment of the at least one roof mount apparatus illustrated in FIG. 11 in accordance with the alternate embodiment of the present invention.
Figure 11C:
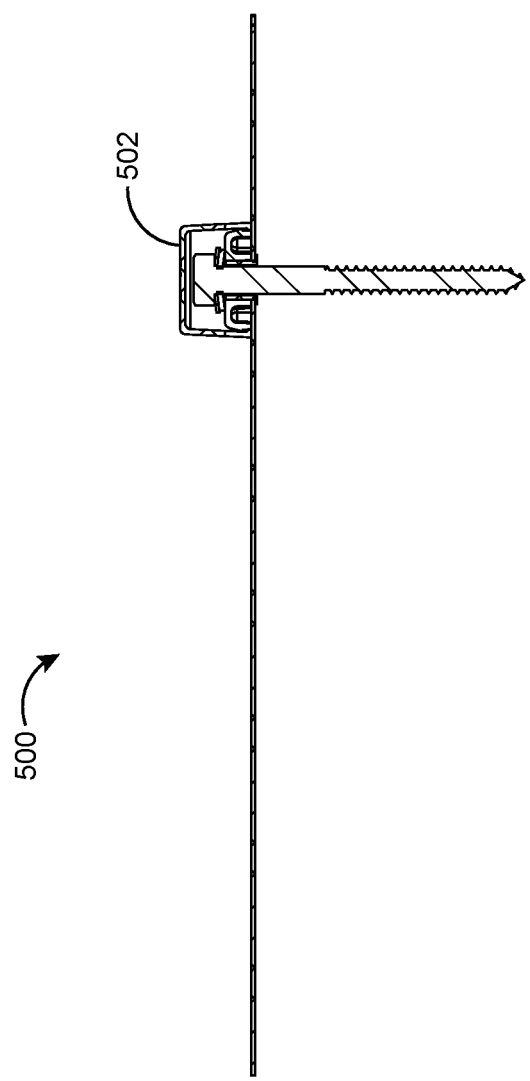
FIG. 11C illustrates the circular cap member with flanges of the at least one roof mount apparatus showing a top cross sectional view of the at least one roof mount apparatus taken along lines B-B of FIG. 11B1 in accordance with an alternate embodiment of the present invention.
Figure 11D:
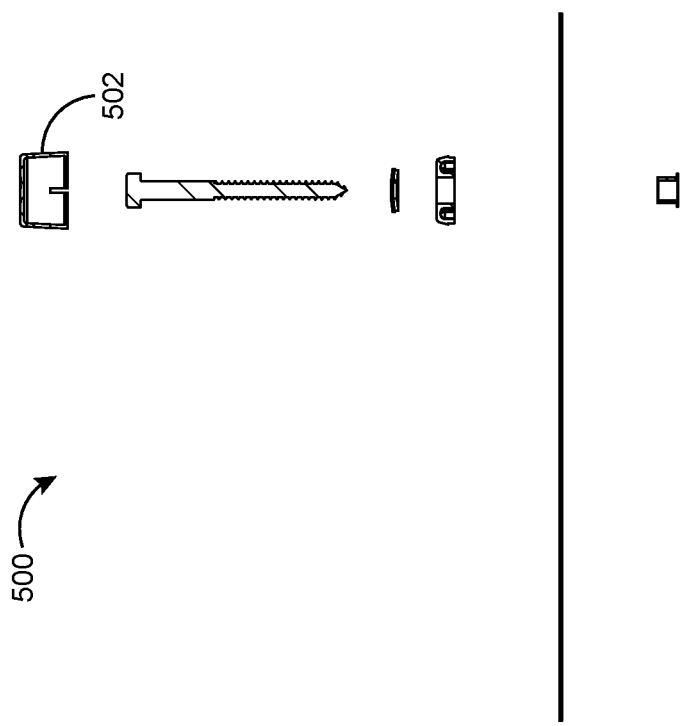
FIG. 11D illustrates a circular cap member with flanges of the at least one roof mount apparatus showing an exploded view of the at least one roof mount apparatus taken along lines D-D of FIG. 11B2 in accordance with an alternate embodiment of the present invention.

FIGS. 11-11D show at least one roof mount apparatus 500 in accordance with an alternate embodiment of the invention wherein a cap member 502 is circular in shape with the plurality of flanges. The cap member 502 is detachably installed over at least one fastener 504 and the block member.

Figure 12:
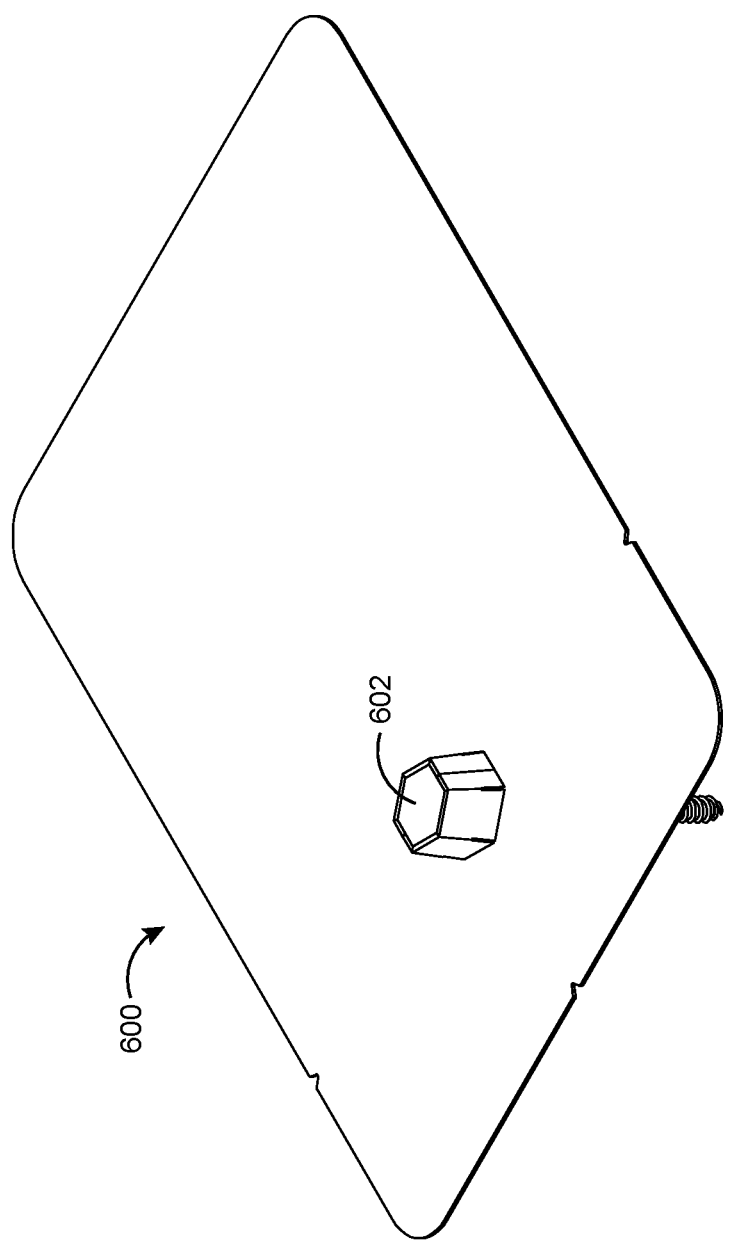
FIG. 12 shows a top perspective view of an alternate embodiment of the at least one roof mount apparatus illustrating a hexagonal cap member with flanges in accordance with an alternate embodiment of the present invention.
Figure 12A:
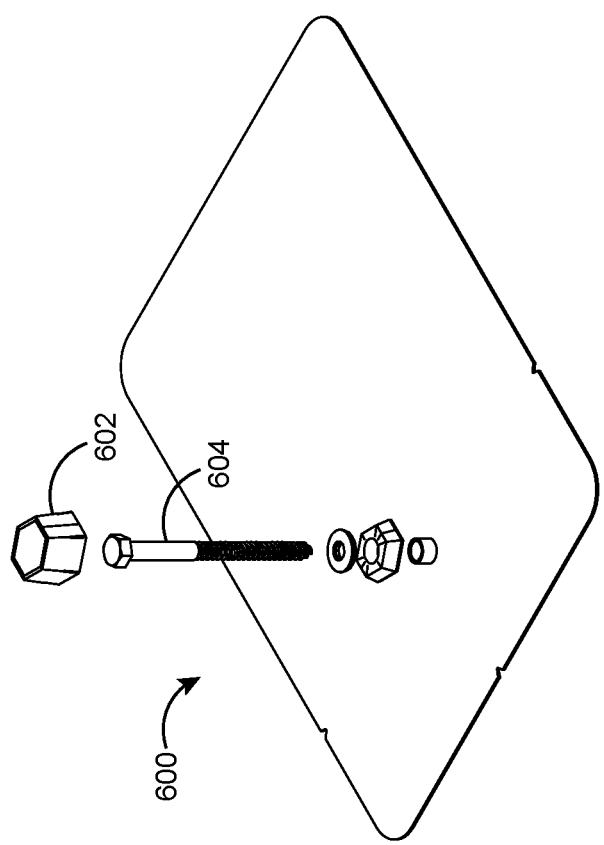
FIG. 12A shows an exploded view of an alternate embodiment of the at least one roof mount apparatus illustrated in FIG. 12 in accordance with the alternate embodiment of the present invention.
Figure 12C:
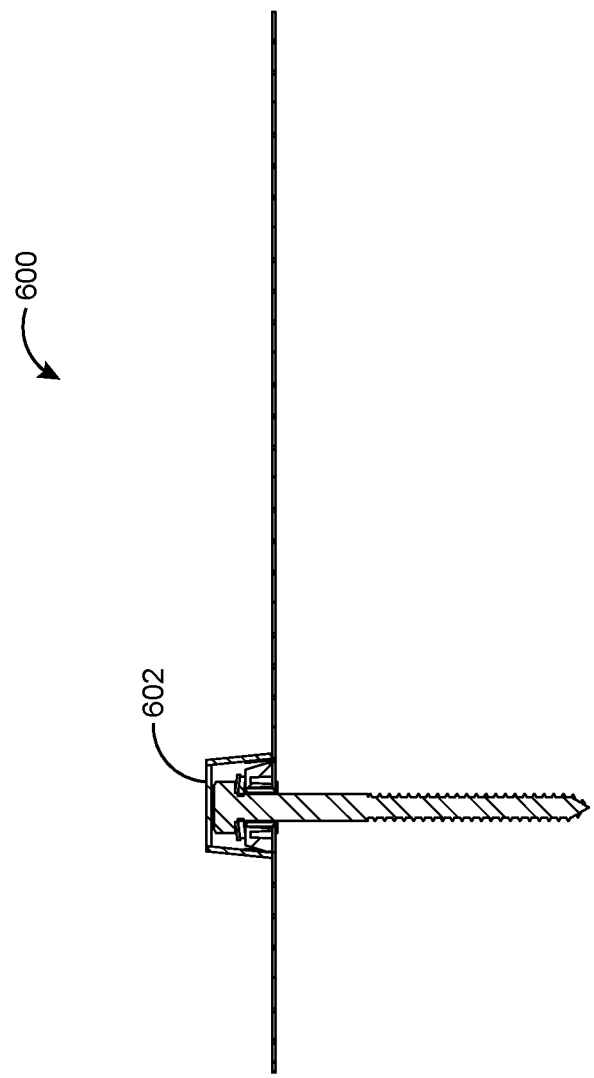
FIG. 12C shows a cross sectional view of an alternate embodiment of at least one roof mount apparatus taken along lines B-B of FIG. 12B1 illustrating the hexagonal cap member of the present invention.

FIGS. 12-12D show at least one roof mount apparatus 600 in accordance with an alternate embodiment, in which a cap member 602 is hexagonal shaped with the plurality of flanges. The cap member 602 is detachably installed over at least one fastener 604 and the block member.

Figure 13:
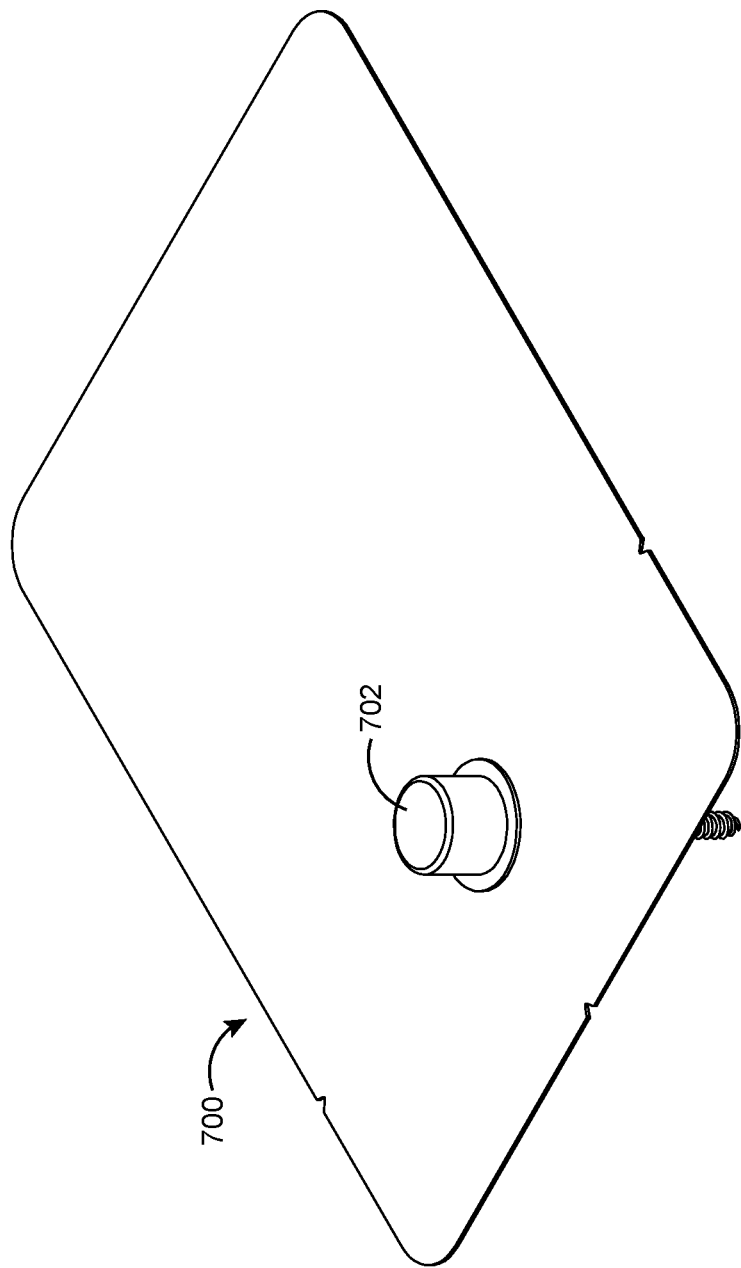
FIG. 13 shows a top perspective view of an alternate embodiment of the at least one roof mount apparatus illustrating a circular cap member without a locking mechanism in accordance with the alternate embodiment of the present invention.
Figure 13A:
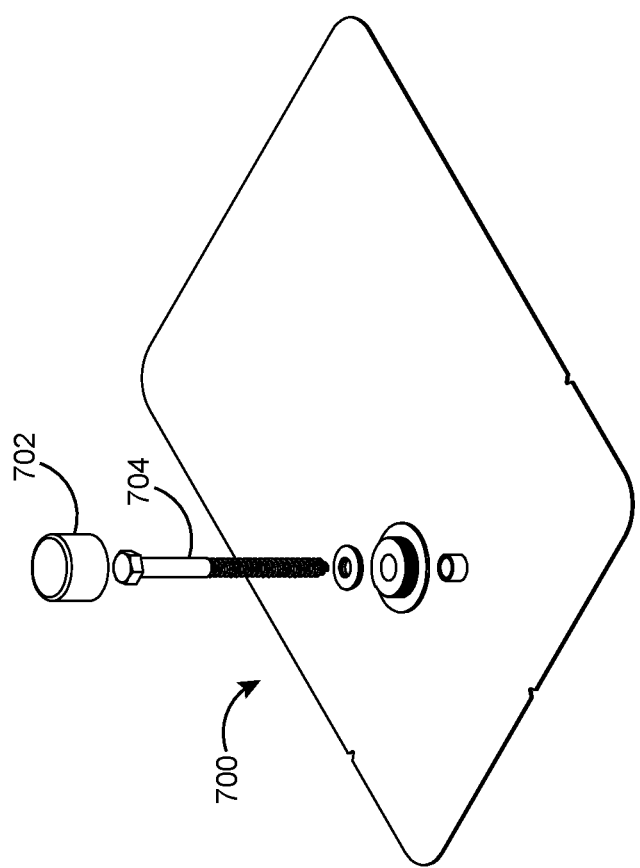
FIG. 13A shows an exploded view of an alternate embodiment of the at least one roof mount apparatus illustrated in FIG. 13 in accordance with an alternate embodiment of the present invention.
Figure 13C:
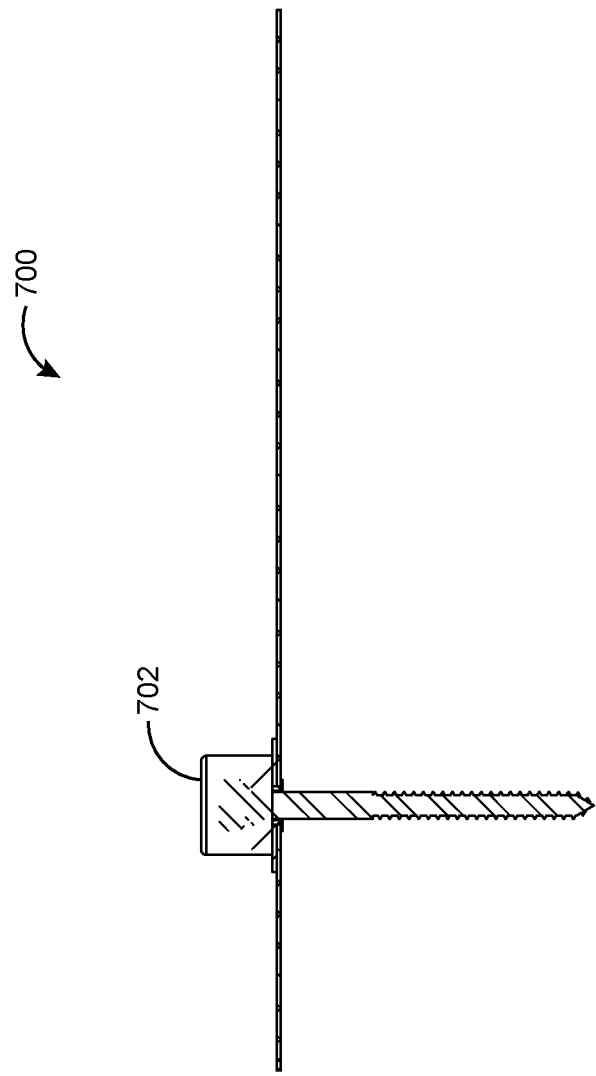
FIG. 13C shows a cross sectional view of an alternate embodiment of at least one roof mount apparatus taken along lines B-B of FIG. 13B1 illustrating the circular cap member of the present invention.
Figure 13D:
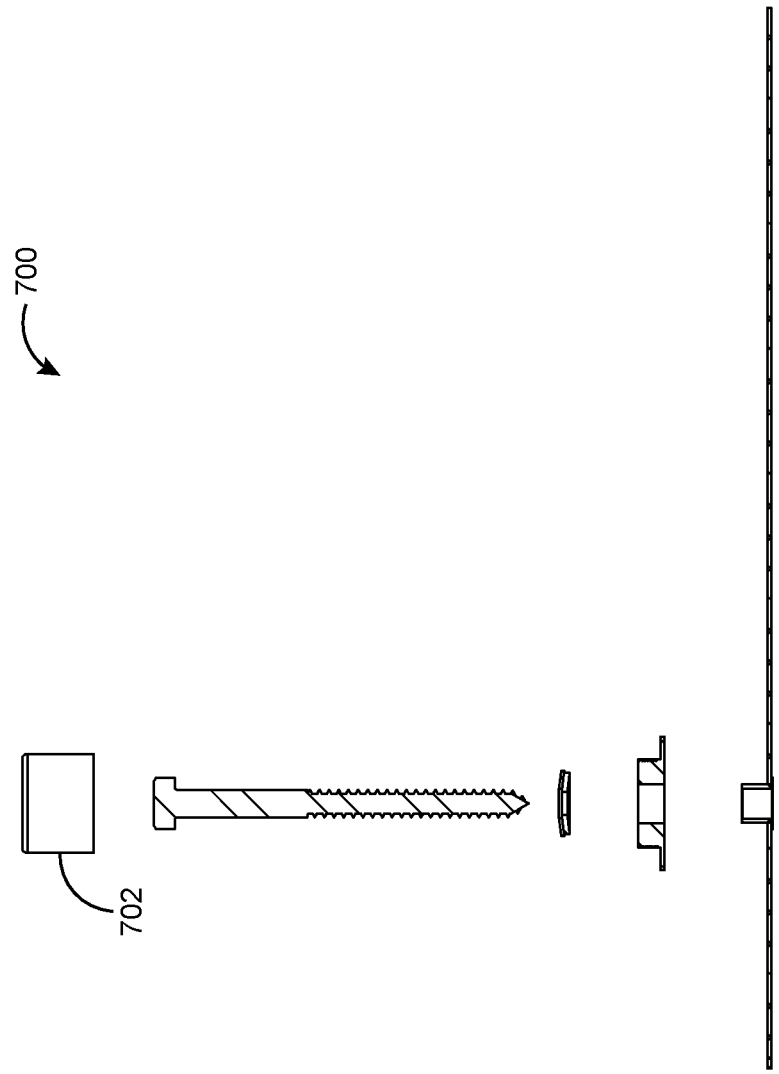
FIG. 13D shows an exploded view of an alternate embodiment least one roof mount apparatus taken along lines D-D of FIG. 13B2 illustrating the circular cap member of the present invention.

FIGS. 13-13D show alternate embodiments of at least one roof mount apparatus 700 in accordance with an alternate embodiment, in which a cap member 702 is circular in shape without the locking mechanism. The cap member 702 detachably installed over at least one fastener 704 and the block member.

Figure 14:
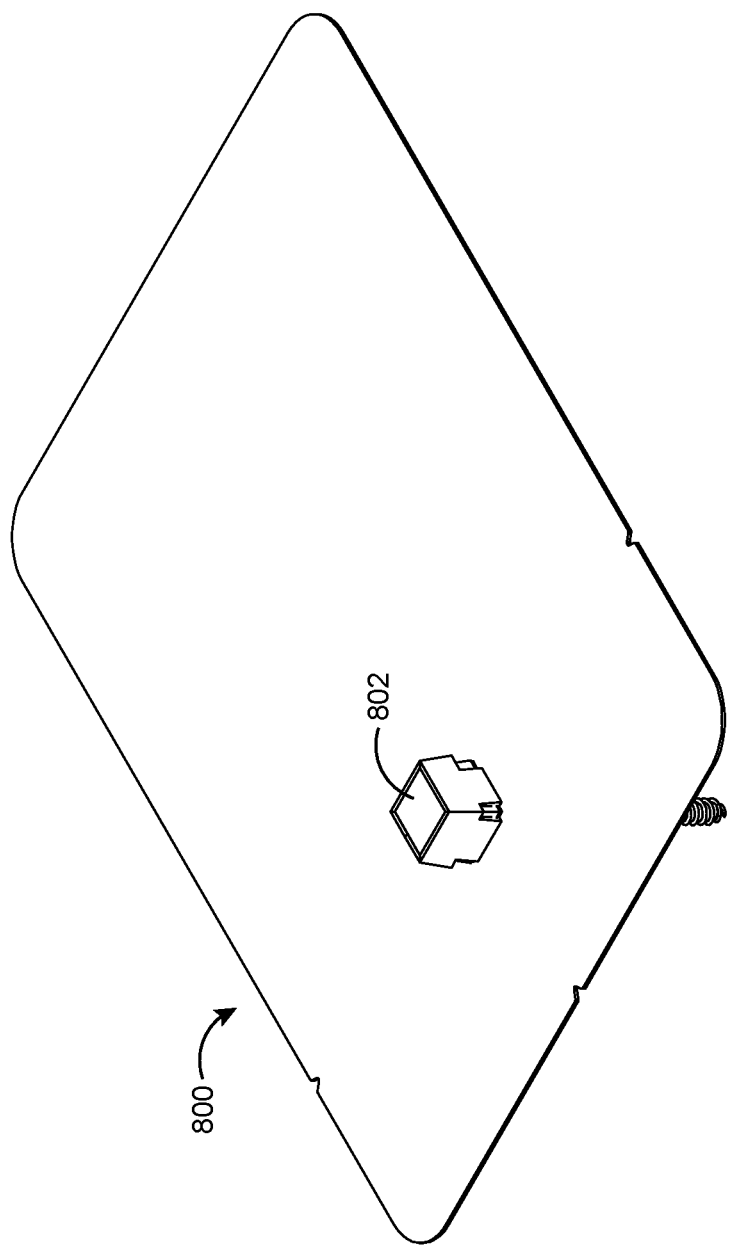
FIG. 14 shows a top perspective view of an alternate embodiment of the at least one roof mount apparatus illustrating a square cap member with flanges in accordance with an alternate embodiment of the present invention.
Figure 14A:
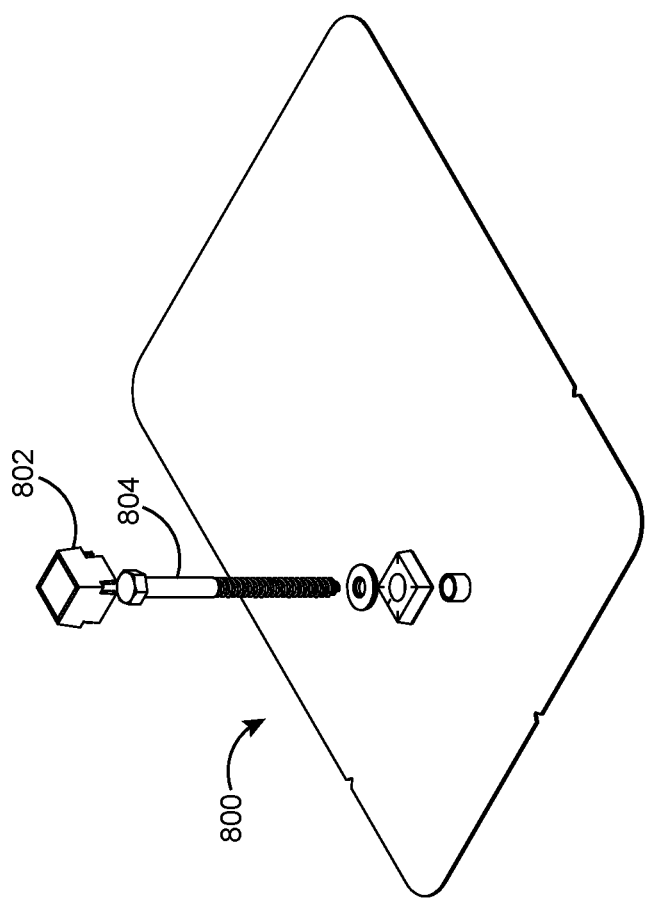
FIG. 14A shows an exploded view of an alternate embodiment of the at least one roof mount apparatus illustrated in FIG. 14 in accordance with an alternate embodiment of the present invention.
Figure 14C:
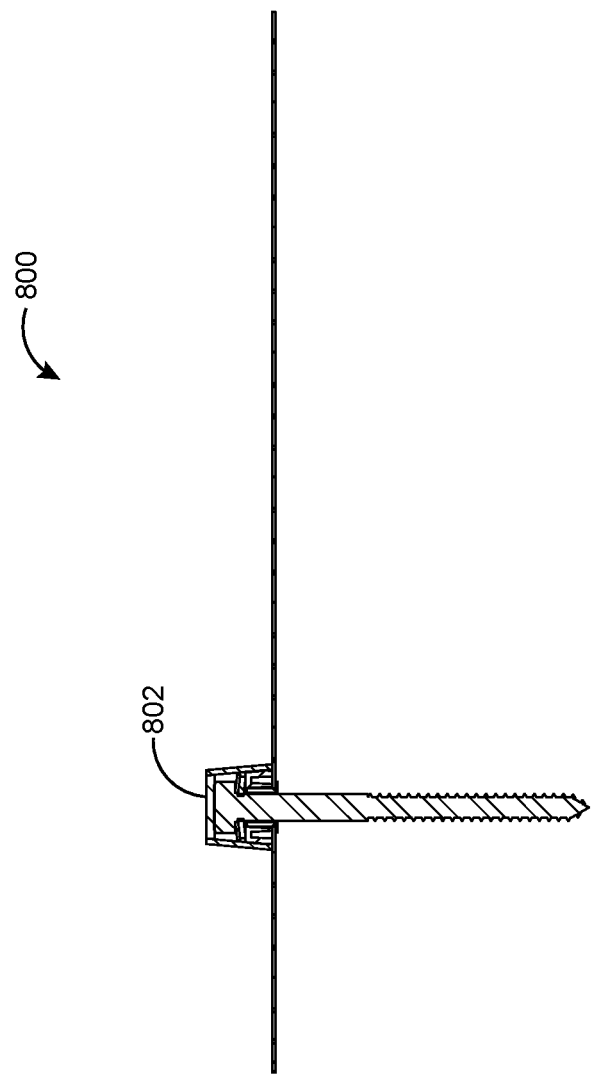
FIG. 14C illustrates the square cap member with flanges of the at least one roof mount apparatus showing a cross sectional view of the at least one roof mount apparatus taken along lines B-B of FIG. 14B1 in accordance with an alternate embodiment of the present invention.

FIGS. 14-14D show alternate embodiments of at least one roof mount apparatus 800 wherein a cap member 802 is square shaped with the plurality of flanges. The cap member 802 detachably installed over at least one fastener 804 and the block member.

Figure 15:
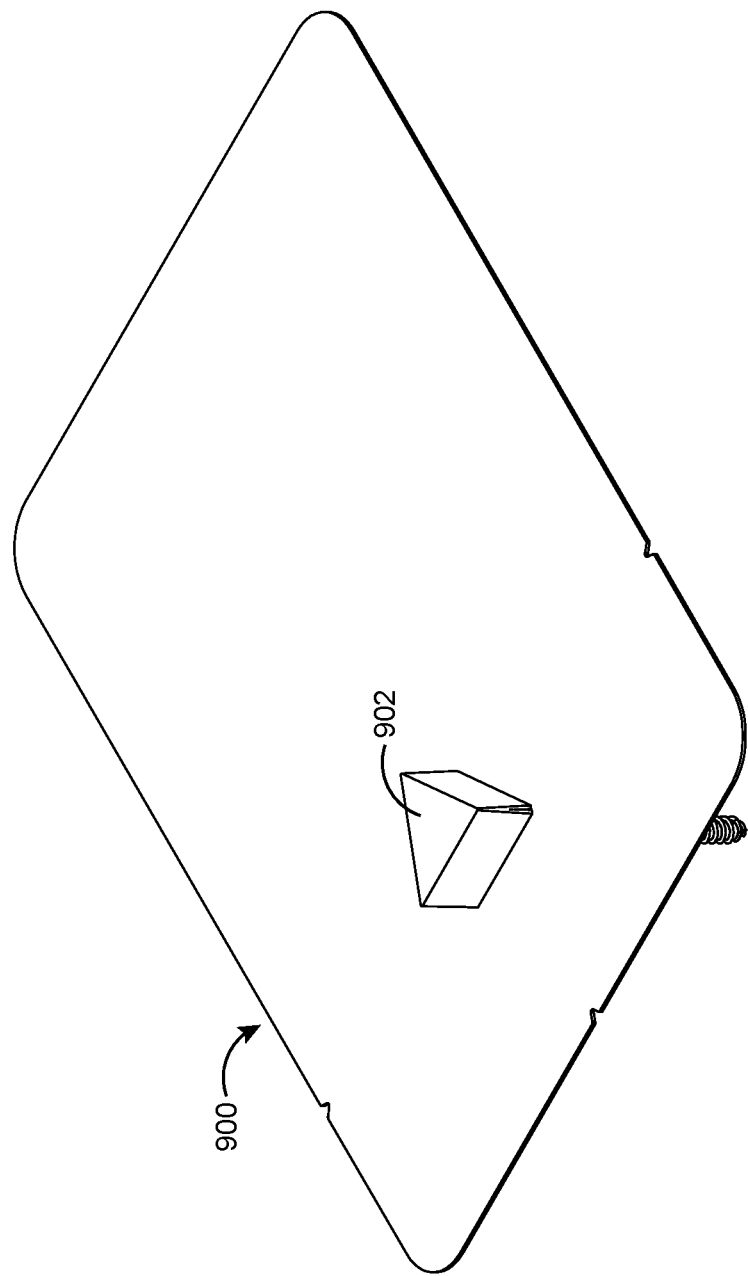
FIG. 15 shows a top perspective view of the at least one roof mount apparatus illustrating a triangular cap member with flanges in accordance with an alternate embodiment of the present invention.
Figure 15A:
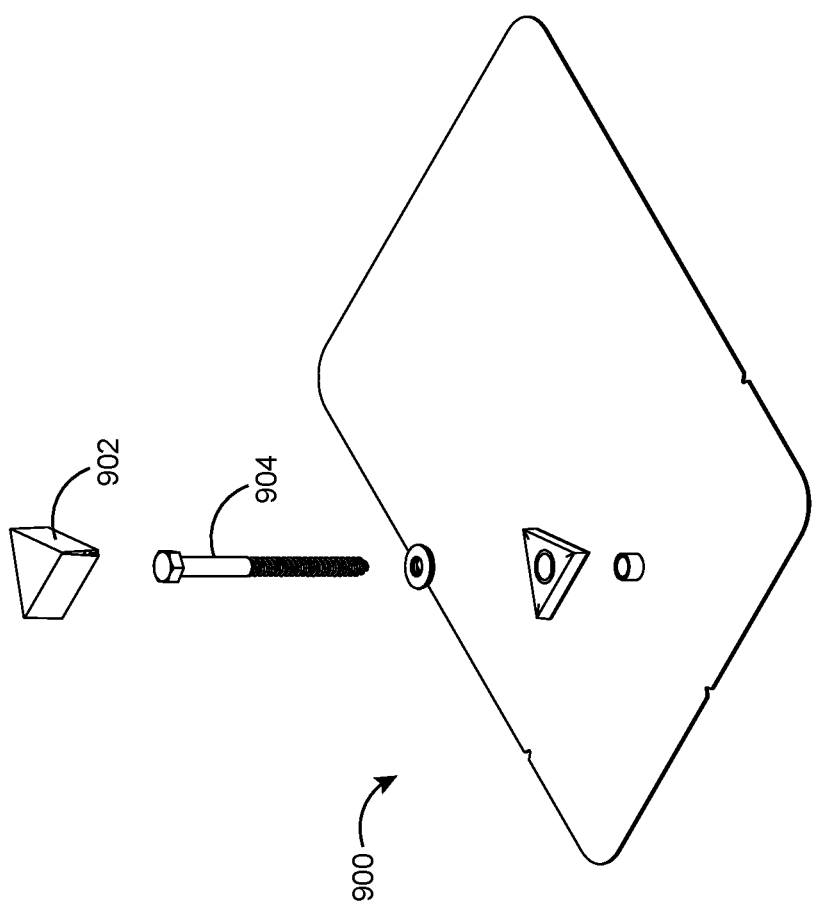
FIG. 15A shows an exploded view of an alternate embodiment of the at least one roof mount apparatus illustrated in FIG. 15 in accordance with an alternate embodiment of the present invention.
Figure 15C:
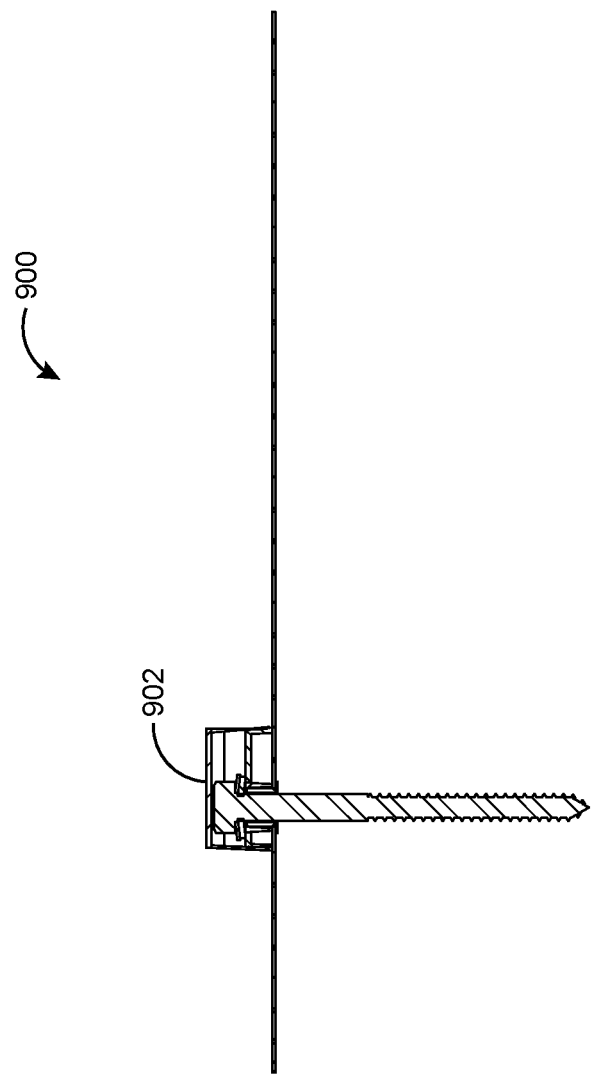
FIG. 15C illustrates the triangle cap member with flanges of the at least one roof mount apparatus showing a top cross sectional view of the at least one roof mount apparatus taken along the lines B-B of FIG. 15B1 in accordance with the alternate embodiment of the present invention.
Figure 15D:
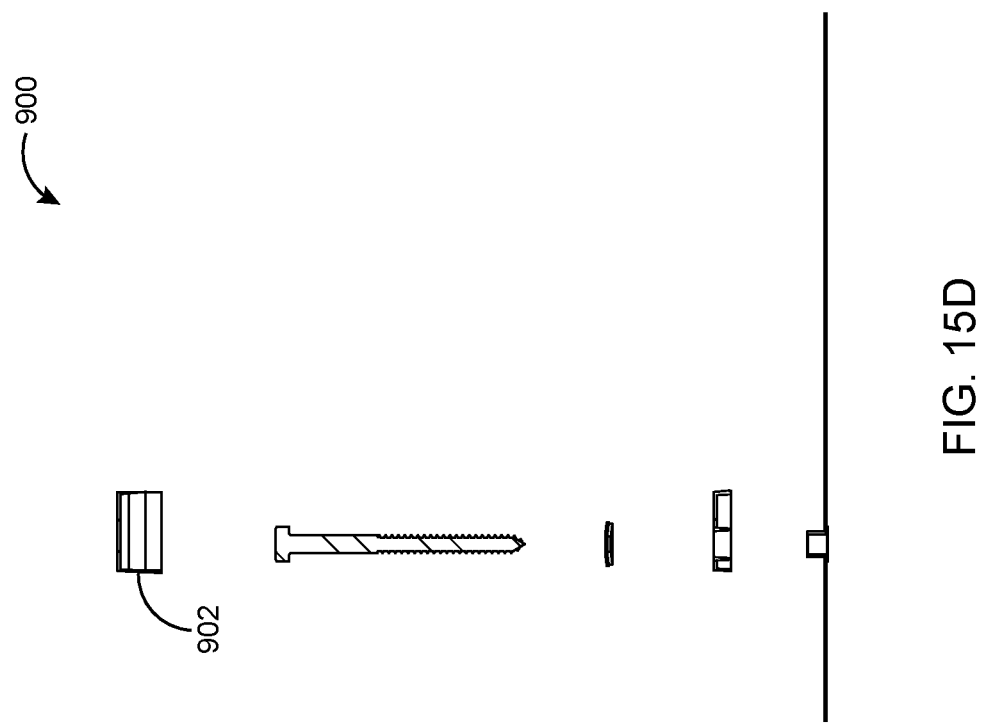
FIG. 15D illustrating the triangle cap member with flanges of the at least one roof mount apparatus showing an exploded view of the at least one roof mount apparatus taken along lines D-D of FIG. 15B2 in accordance with an alternate embodiment of the present invention.

FIGS. 15-15D show alternate embodiments of at least one roof mount apparatus 900 of the present invention, in which a cap member 902 is triangular shaped with a plurality of flanges. The cap member 902 is detachably installed over at least one fastener 904 and the block member.

16A-16B illustrate two examples of further racking and hardware that can be connected either directly on the flashing 18 or to the block member 24. FIG. 16A illustrates an example of a rail free racking system. This example is one of several rail free racking systems that could be connected to the roof mount apparatus of the instant invention. FIG. 16B illustrates an example of standard mount and rail racking system. This example is one of several standard mount and rail racking systems that could connect to the apparatus of the instant invention. In addition to these types of systems the apparatus of the instant invention can connect to other types of racking systems including shared rail systems and a myriad of accessories including conduit mounting hardware and junction boxes.

Figure 17:
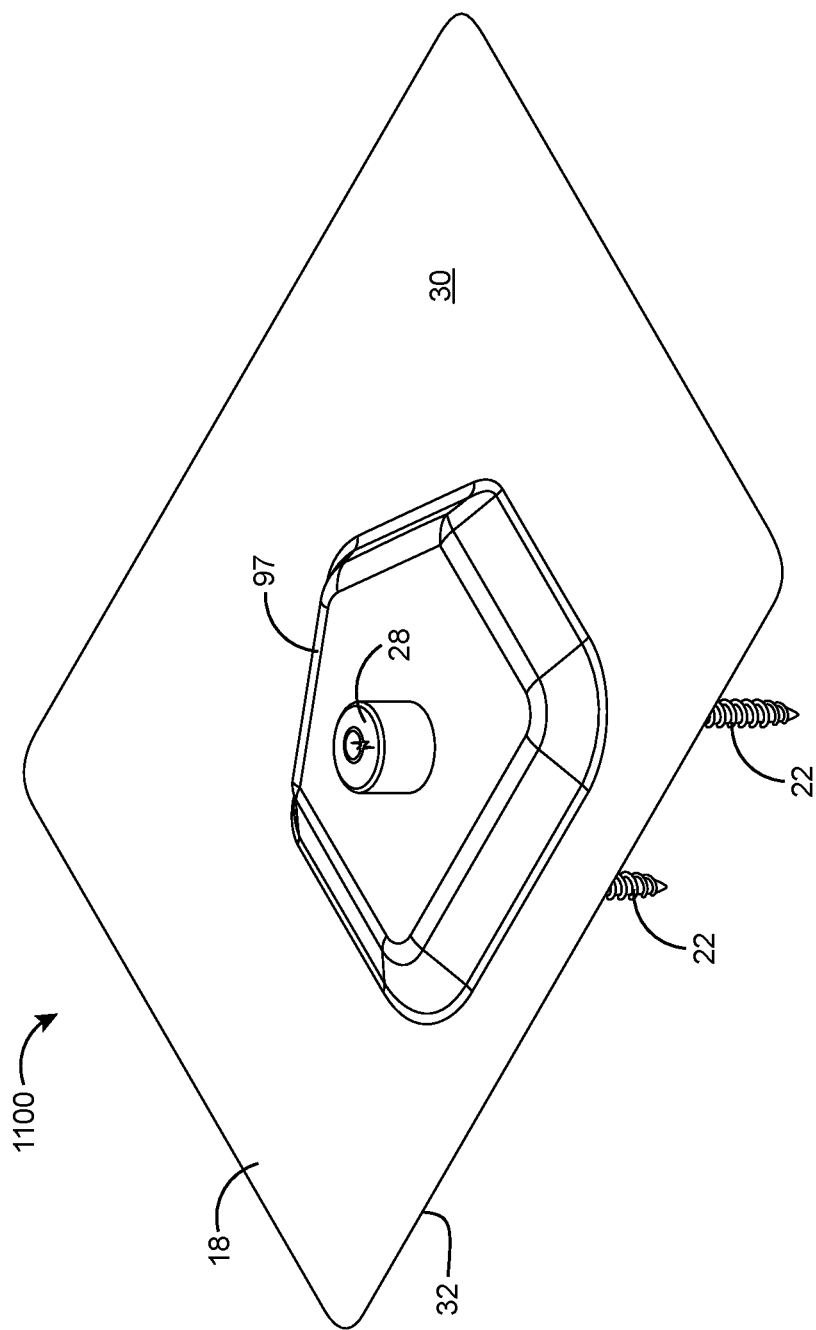
FIG. 17 is a perspective view of an alternate embodiment of the roof mount apparatus having a pentagonal cover.
Figure 18:
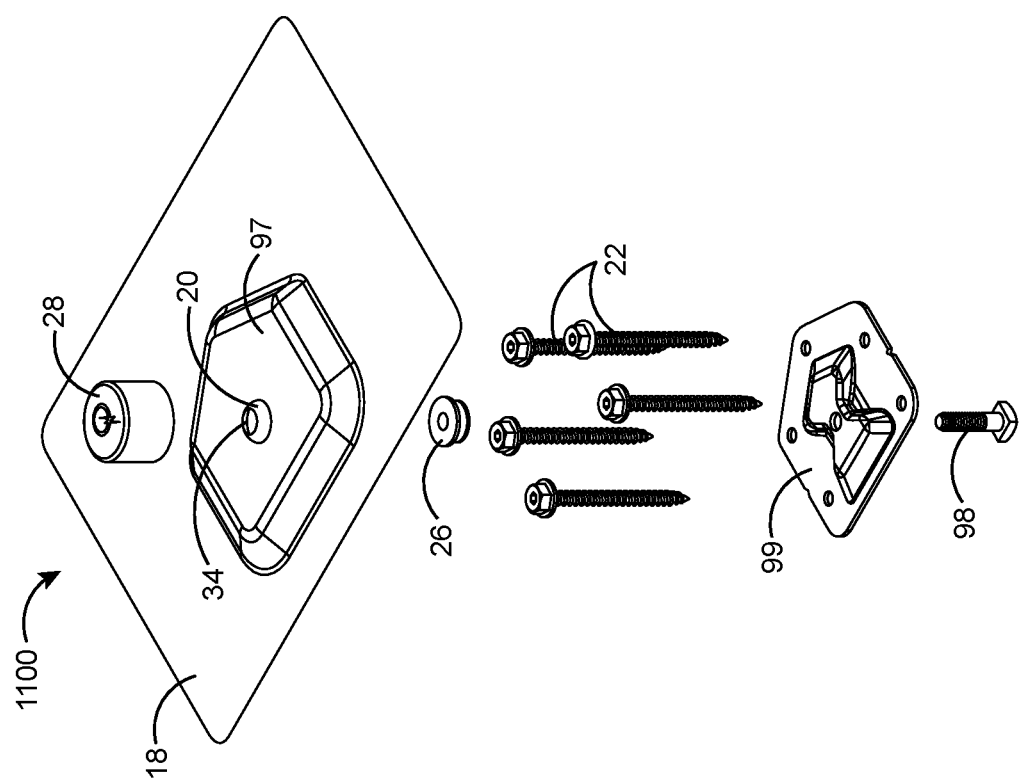
FIG. 18 is an exploded perspective view of the alternate embodiment of the roof mount apparatus having a pentagonal cover.

In some embodiments the block external threads and/or locking mechanism may serve to attach/connect further hardware to the roof mount apparatus. In these embodiments, the cap only is removed while the fastener and block remain in place. The further racking hardware and solar panels are then connected to the roof mount apparatus. FIGS. 17-18 show at least one roof mount apparatus 1100 in accordance with an alternative embodiment in which the flashing 18 includes a second projection 97. The block member 99 is connected to the roof structure with fasteners 22 below the flashing 18 and the second projection 97 covers the block. A connecting member 98 extends upwardly through the aperture 34 and includes an outside perimeter having a plurality of block threads or other locking mechanism configured to engage the cap member 28 which may include an inside perimeter having a plurality of cap threads and a locking mechanism adaptable to couple the cap member to the connecting member 98. In this embodiment the seal 26 is compressed between the cap member 28 and the projection 20.

Figure 19:
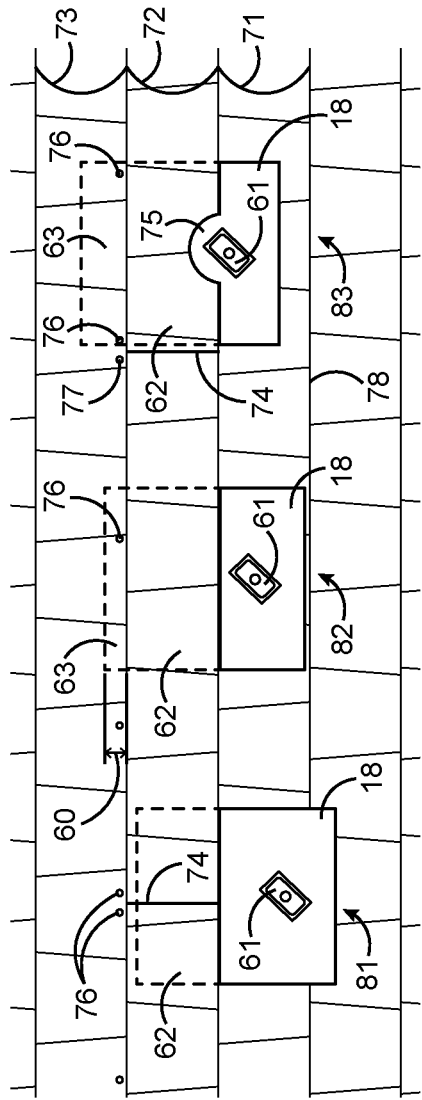
FIG. 19 is a first plan view of roof with flashing shown partially in phantom lines to represent a positioning partially under the roof structure.
Figure 20:
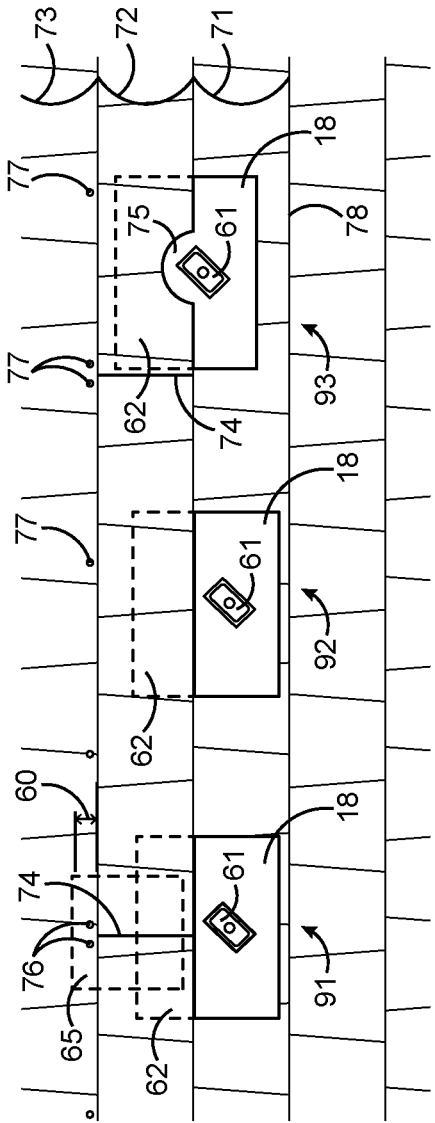
FIG. 20 is a second plan view of roof with flashing shown partially in phantom lines to represent a positioning partially under the roof structure.

In other embodiments, the shorter flashing is used at the keyway/shingle joint and flashing intersection and an additional flat flashing is used on top of the flashing 18 to extend the water-shedding capacity of the flashing up under the third course as shown in FIGS. 19-20. FIG. 19 illustrates an architectural composition shingle roof system 1001 with three examples of roof mount apparatuses installed on the roof according to traditional flashing installation methodology. Roof mount apparatus 82 shows a properly installed apparatus with the flashing 18 positioned on top of the first course of shingles 71, a portion of the flashing 62 extending up under the second course of shingles 72 and a portion of the flashing 63 extending under the third course of shingles 73. The extent of portion 63 that extends up under the third course of shingles 73 is commonly referred to as the headlap 60. This headlap 60 is a critical part of the water shedding capacity of the flashing system where the joint in the shingles (where one piece of roofing material meets the next piece) 74. The roof mount apparatus shows a symbolic mounting hardware 61 positioned on the flashing 18 in the subsequent state of the preferred embodiment of the invention when the cap member 28 has been removed and replaced by the further mounting hardware represented by the block 61. Apparatus 83 shows an alternate acceptable traditional flashing 18 installation with a greater headlap 60 as compared to apparatus 82. The shingle butt edge 78 of the second course of shingles 72 is partially cut away and removed at the area of the subsequent hardware 61 to allow a space 75 between the shingle and the hardware 61. Roof mount apparatus 81 shows an improper installation. In this position the flashing 18 includes a portion 62 that extends up under the second course of shingles 72 but does not extend up under the third course of shingles 73. The shingle joint 74 intersects with the flashing 18 location allowing water to pass between the pieces of shingle above the flashing and thereby continue under the flashing and into the fastener penetration and infiltrate the building causing damage to roof structure. Proper installation requires removal of nails 76 that are located beneath the third course 73 and serve to attach the second course 72 to the roof sheathing. Nails 77 do not obstruct the flashing 18 from extending up under the third course 73 and do not need to be removed.

FIG. 20 illustrates an architectural composition shingle roof system 1002 with three examples of the preferred embodiment of the roof mount apparatus installed on the roof according to flashing installation methodology enabled by and according to the instant invention. Roof mount apparatus 91, 92, and 93 all show flashing 18 positioned on the roof in an acceptable and waterproof location and method. Roof mount apparatus 92 shows the typical position. Flashing 18 is positioned on the first course of shingles 71 and a portion of the flashing 62 extends up under the second course of shingles 72. There is no shingle joint 74 intersecting with the flashing 18 location and therefore no need for the flashing to extend up under the third course of shingles 73. Roof apparatus 93 shows an alternate acceptable positioning and installation of the flashing 18 including a portion of the flashing 62 extending up under the second course of shingles 72 and similarly to apparatus 92 there is no need for the flashing to extend up under the third course of shingles 73 and therefore the nails 77 do not need to be removed. The portion of the butt edge 78 of the second course of shingles 72 is removed to create the gap 75 between the shingle and the hardware 61. Roof mount apparatus 91 is located at an intersection with the shingle joint 74. To prevent water infiltration through the shingle joint 74, behind the flashing 18, and into the roof structure, an additional flashing 65 is introduced between the first course of shingles 71 and the second course of shingles 72 on top of the flashing 18. Additional flashing 65 is positioned with its top edge extending up under the third course 73 effectively extending the water shedding capacity of the roof mount apparatus 91 beyond the shingle joint 74 and creating the required headlap 60. Nails 76 are removed.

Figure 21:
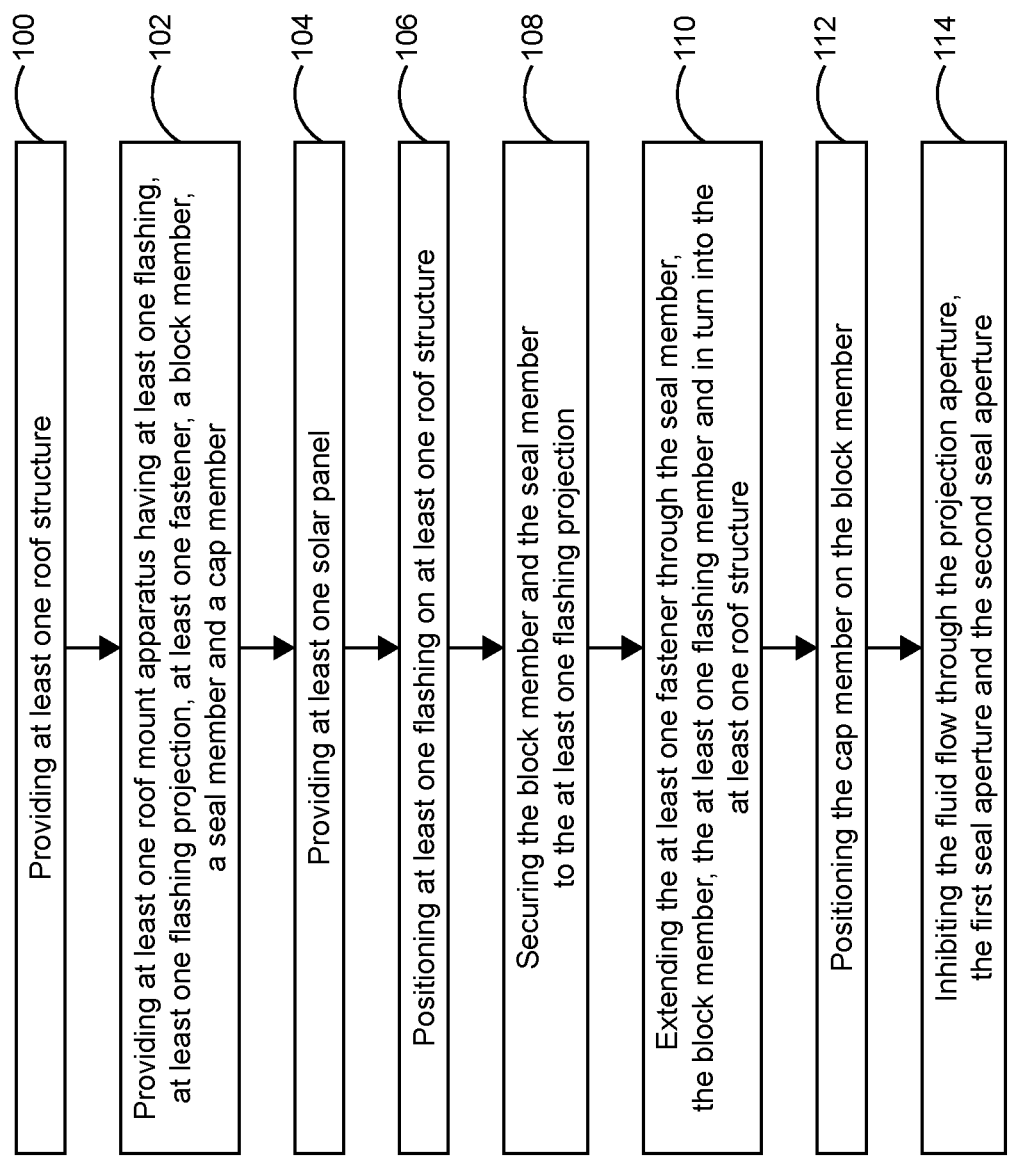
FIG. 21 is a flowchart of a method for mounting the at least one roof mount system in accordance with the preferred embodiment of the present invention.

FIG. 21 illustrates a flowchart of a method for mounting at least one roof mount system 10. The method commences by providing a roof structure as shown in block 100. Next, providing at least one roof mount apparatus having at least one flashing, at least one flashing projection, at least one fastener, a block member, a seal member and a cap member as shown in block 102. Thereafter, providing at least one solar panel as shown in block 104. Next, positioning at least one flashing on the roof structure as indicated at block 106. Thereafter, securing the block member and the seal member to the at least one flashing projection as shown in block 108. Thereafter, extending the at least one fastener through the seal member, the block member, the at least one flashing member and in turn into the roof structure as shown in block 110. Next, positioning the cap member on the block member as indicated at block 112 and finally, inhibiting the fluid flow through the projection aperture, the first seal aperture and the second seal aperture as indicated at block 114.

In the preferred embodiment, the at least one roof mount apparatus 14 comprises temporarily installed components, some of which may be later removed to allow the attachment of other solar and solar racking components, such as a standard L-bracket mount. The temporary components may include a cap, fastener, and block, and any combination of the three may be optionally removed after installation. Given the wide variety of roof types subsequently installed hardware contemplated by the present invention, a variety of mounts that may be used. It follows that alternative embodiments of the invention are contemplated, such as those adapted to use with a variety of elevated water seal mounts and the like. The variety of potential mounts create a need for different sized and configurations of components. One component that requires a variety of sizes is the at least one flashing 18. Typical sizes, provided for the purposes of example, include: 8"×8", 8"×10", 8"×12", 9"×12", 12"×12", 17"×17" and 18"×18". The at least one flashing thicknesses vary from 0.019" to 0.050", for example. Another component with varying sizes is the at least one flashing projection which may have a height, for example, from 0.350" to 0.700" (0.310" to 0.650" net above the at least one flashing). In the preferred embodiment the at least one fastener 22 has a 5/16" diameter. Alternate screw sizes and diameters may be used for different mounting applications. The at least one flashing projection 20 could also have alternate diameters and sizes of apertures to accommodate different sized fasteners 22. This wide variety of roof mounts contemplated by the present invention requires a variety of sizes of the cap member 28 as well. Indeed, the roof mount system 10 disclosed herein is capable of supporting any of a variety of roof-mounted fixtures, such as snow guards, snow fences, solar panels, antenna, signs, billboards, or any other apparatus mountable to the roof structure.

In use, the aforementioned invention has several benefits. Among them, the installation of the roof mount system 10 at the time of roof installation reduces damage to the roofing materials and decreases the risk of damage to the roof and leaks resulting from damage either in temporal proximity to the installation resulting from some improper installation method or over time through accelerated degradation of the roofing materials. The system does this by (1) integrating the at least one flashing 18 and at least one roof mount apparatus 14 into the roofing materials during installation by qualified roofing professionals, (2) eliminating the need to disrupt the integrity of the roofing system when installing the balance of the array, racking, modules, etc., and (3) minimizing the time spent on the roof by the solar installers at a later point when the roofing is of an advanced age and potentially more vulnerable to damage from walking on the roof, when the installer is under time pressures to get the job done which may lead to working outside the acceptable working temperature range of the roofing materials, and when the installer may not have the entire knowledge skill and training to know when and how to install the mounts without causing avoidable damage. As shown in FIG. 16, a solar racking components 202 may be installed to the equipment presented in this application.

In use, the present roof mount system 10 provides a reduction in required materials for typical solar installation. Typical installation code requires solar installers and roofers to follow the manufacturer's printed instructions. Some roofing manufacturers require the installers to follow NRCA (National Roofing Contractors Association) or ARMA (Asphalt Roofing Manufacturers Association) standards, which is require the upper edge of the at least one flashing 18 extend up under the bottom edge (or butt edge) of the third course, wherein "upper" and "lower" are in reference to the roof upper portion 110 and roof lower portion 112 (see FIG. 5). The top portion of a shingle or the at least one flashing 18 that extends up under the third course is commonly referred to as the head lap. This head lap is required on all the shingles and typically on the at least one flashing 18 to maintain the water-shedding action of the roof mount system 10 where joints between shingles or keyways between shingle tabs would otherwise allow water to pass between the shingle joints or keyways of the second course and under the top of the first course of shingles or the top portion of the at least one flashing 18.

Installation by a roofer at the time of roofing is first constructed can take advantage of certain changes to shingle technology that have recently evolved. In the past, 3-tab shingles made up the vast majority of shingles installed in the US. Currently, high definition/architectural shingles make up 90% of the market for new roofs. In 3-tab shingles the keyway and/or shingle joint occurs every 12" across the roof. With the new architectural shingles there is no keyway and the shingle joints occur every 12" or 39⅛". With mount spacings occurring at multiples of rafter spacings the common mount spacings are 48", 64" and 72". Thus, while in the past the intersection of flashed mounts and keyways and/or shingle joints was very common, today it is estimated at less than 10% intersection and in some instances there can be less than 3% intersection between flashed mounts and keyways/shingle joints. However, it can still occur, and to prevent against water intrusion in those instances, the solar industry still typically uses larger than necessary flashing in most locations. This is because solar racks are typically retrofit to an existing roof by a non-roofer installer. The non-roofer installer may not have adequate experience to recognize where longer flashings are and are not needed, thus the industry norm is to simply use long flashings in all locations.

But with this presently disclosed system installed by a roofer who is contemporaneously installing the roof, the experienced decision-making to install shorter flashings of approximately 8"×7" to 9"×10" and 12"×7" (8" to 12"×7" to 10") extending up under the second course of shingles but not the third, where the keyway/shingle joint does not intersect the flashings may occur. Where the keyway/shingle joint does intersect the at least one flashing 18, the at least one flashing 18 need still be placed up under the third course and in that case the roofer uses a 12" long flashing 18, or a small extension flashing to extend the at least one flashing 18 up under the third course.

In one embodiment, the system comprises a method for mounting at least one roof mount system, the method comprising the steps of: providing a roof structure; providing at least one roof mount apparatus having at least one flashing, at least one flashing projection, at least one fastener, a block member, a seal member and a cap member; providing at least one solar panel; positioning at least one flashing on roof structure; securing the block member and the seal member to the at least one flashing projection; extending the at least one fastener through the seal member, the block member, the at least one flashing member and in turn into the roof structure; positioning the cap member on the block member; and inhibiting the fluid flow through the projection aperture, the first seal aperture and the second seal aperture.

In an alternative embodiment the at least one flashing includes a flashing top surface and a flashing bottom surface, or may be positioned adjacent to the roof structure. In other embodiments, the at least one flashing projection extends upward from the roof structure and includes a projection aperture. In still other embodiments the seal member includes a first portion having a first seal aperture and a second portion having a second seal aperture. Preferably, the at least one fastener passes through the projection aperture, the first seal aperture and the second seal aperture, which are concentrically aligned. The at least one fastener secures the seal member, the block member and the at least one flashing fixed in place on the roof structure during installation, and the cap member includes an inside perimeter having a plurality of cap threads. The block member may include an outside perimeter having a plurality of block threads or other locking mechanism configured to engage the plurality of cap threads, and the cap member may include a locking mechanism adaptable to couple the cap member to the block member. In some embodiments the block threads and or locking mechanism may be configured to engage internal threads of further racking hardware and/or brackets or standoffs.

An additional feature of the invention presents at least one flashing 18 that is scored horizontally with a score line 111 across the upper half of the at least one flashing 18 at approximately 7" to 10" from the bottom of the at least one flashing 18 wherein "upper" and "lower" are in reference to the roof upper portion 110 and roof lower portion 112 (see FIG. 5). This provides the installer the ability to "snap" off the sometimes-unnecessary top portion of a flashing 30 that would otherwise extend up under the third course creating the head lap. Because the roof mount system is installed at the time of roofing installation by qualified roofers (who understand when the head lap requirement actually benefits the waterproofing capacity of the roofing system) the elimination of the head lap when a 3-tab shingle keyway or any shingle joint is not present has no negative impact on the roofing and at least one flashing 18 systems. As well as not having negative impact, eliminating unneeded head laps also allows the qualified installer the ability to save labor and time removing nails and/or separating shingles. A further additional feature of the invention presents at least one flashing sized to extend up under only the second course of shingles and not the third course of shingles thus eliminating an unneeded headlap and reducing installation time and costs by eliminating the need to "break" the seal at the third course and remove the nails where it is no longer necessary.

As discussed above, the present invention addresses several problems that persist in the field: expensive construction costs associated with solar systems, time pressures on installers that may cause them to work outside best practice temperature windows, and damage to roofs that may require expensive and/or damaging reinstalls of the solar system and their supporting structures. In the case of roof mount system 10, the at least one flashing 18 and temporary mounts are already installed when the solar installer begins working, advantages are realized: 1) the time spent on the roof is reduced significantly, 2) roof damage is reduced, 3) the costs associated with solar installation are reduced, 4) enhanced operational efficiencies are realized as the installer can now more efficiently install the array, and 5) the costs of the entire solar array can be deferred to a time more suitable to the building owner without compromising the quality and code compliance of the mounting hardware installation. Not only are time costs reduced, the roof mount system 10 also relatedly reduces the breaking away and loss of roofing surface granules and decreases the risk of working outside the acceptable temperature range of the roofing materials. Taken together, these advantages serve to both reduce the installation company's liability and promote quality solar installations in general.

An additional benefit of roof mount system 10 described herein is that because the system is installed at the time of roof construction, professional roofing installers are performing the installation, waterproofing, etc. As a result, installation of both the roof structure 12 and mounts are carried out by those with the training and skills required to ensure roofing codes and best practices are followed. In addition, the associated mounts become part of the roofer's work covered by the roofer's workmanship guarantee rather than an aftermarket product that could void the roofing manufacturer's warranty. The warranty and guarantees are where they belong: with the roofing manufacturer and installer.

Finally, an important feature of this invention is the aesthetic quality of the roof mount system 10. The roof mount system 10 may optionally include a cover or cap member of a color that matches or coordinates with the roofing color and from a size standpoint, as compared to conventional racking components is relatively small. This minimizes the visual impact of the roof mount system 10 and removes the typical mechanical feel of a distribution of at least one roof fastener 22 and brackets. The general impression on a viewer is that the roof is aesthetically pleasing.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for configuring a solar-rack ready roof mount system, the method comprising:
   providing a roof structure;
   installing on the roof structure at least one roof mount apparatus comprising:
     at least one flashing;
     at least one flashing projection positioned at the at least one flashing;
     at least one fastener connecting the at least one flashing with the roof structure, the fastener penetrating the projection, the flashing, and the roof structure;
     a block member coupled to the at least one flashing projection;
     a seal member receiving the at least one fastener there through; and
     a cap member detachably installed over the at least one fastener and the block member; and
   extending the at least one fastener through the seal member and the one flashing projection aperture;
   positioning the cap member on the block member and inhibiting fluid flow through the projection aperture;
   detaching the block, fastener, and cap;
   replacing the block member, at least one fastener, and cap member with solar racking and solar panels installed on the roof mount apparatus, thereby-providing a watertight securement and reduction of wear and tear on a roofing structure and shingle.

2. The method for configuring a solar-rack ready roof mount system of claim 1 wherein the at least one flashing includes a flashing top surface and a flashing bottom surface.

3. The method for configuring a solar-rack ready roof mount system of claim 2 further comprising installing the at least one flashing bottom surface adjacent the roof structure.

4. The method for configuring a solar-rack ready roof mount system of claim 1 wherein the at least one flashing projection extends upward from the roof structure.

5. The method for configuring a solar-rack ready roof mount system of claim 1 wherein the seal member includes a first portion comprising a first seal aperture and a second portion comprising a second seal aperture, and wherein the cap member inhibits fluid flow through the first and second seal apertures.

6. The method for configuring a solar-rack ready roof mount system of claim 1 comprising extending the at least one fastener passes through a first seal aperture and a second seal aperture.

7. The method for configuring a solar-rack ready roof mount system of claim 1 wherein the at least one fastener includes a threaded portion of a first diameter and a non-threaded portion of a second diameter, wherein the second diameter is larger than the first diameter.

8. The method for configuring a solar-rack ready roof mount system of claim 7 further comprising:
   securing with the at least one fastener the seal member, the block member and the at least one flashing in place on the roof structure during said installing step, such that said first diameter creates a pilot hole;
   wherein in said replacing step said fastener extends through said pilot hole.

9. The method for configuring a solar-rack ready roof mount system of claim 1 wherein the cap member includes an inside perimeter having a plurality of cap threads.

10. The method for configuring a solar-rack ready roof mount system of claim 1 wherein the block member includes an outside perimeter having a plurality of block threads configured to engage the plurality of cap threads.

11. The method for configuring a solar-rack ready roof mount system of claim 1 wherein the cap member includes a locking mechanism adaptable to couple the cap member to the block member.

12. The method for configuring a solar-rack ready roof mount system of claim 1 wherein the projection aperture, a first seal aperture and a second seal aperture are concentrically aligned.

13. A method for configuring a solar-rack ready roof mount system, the method comprising:
providing a roof structure;
installing on the roof structure at least one roof mount apparatus comprising:
at least one flashing including a flashing top surface and a flashing bottom surface;
at least one flashing projection positioned at the at least one flashing, the at least one flashing projection including a projection aperture;
at least one fastener connecting the at least one flashing with the roof structure, and wherein the at least one fastener includes a threaded portion of a first diameter and a non-threaded portion of a second diameter, and said first diameter is sized appropriately to allow it to create a pilot hole for the non-threaded portion second diameter, the fastener penetrating the projection, the flashing, and the roof structure;
a block member coupled to the at least one flashing projection including a block member aperture configured to surround the flashing projection;
a seal member receiving the at least one fastener therethrough, the seal member including a first portion and a second portion, and providing a water-tight securement; and
a cap member detachably installed over the at least one fastener and the block member, the cap member including a locking mechanism adaptable to removably couple the cap member to the block member, and the cap member obstructs the installation of additional solar racking materials;
detaching the block, fastener, and cap;
replacing the block member, at least one fastener, and cap member with solar racking and solar panels installed on the roof mount apparatus, thereby-providing a water-tight securement and reduction of wear and tear on a roofing structure and shingle;
whereby the removal of the cap removes the obstruction of installation of additional solar racking materials.

14. The method for configuring a solar-rack ready roof mount system of claim 13 wherein the at least one flashing projection extends upward from the roof structure.

15. The method for configuring a solar-rack ready roof mount system of claim 13 wherein the seal member first portion comprises a first seal aperture and the seal member second portion comprises a second seal aperture.

16. The method for configuring a solar-rack ready roof mount system of claim 13 wherein the at least one fastener passes through the projection aperture, the block member aperture, a first seal aperture and a second seal aperture, which are concentrically aligned.

17. The method for configuring a solar-rack ready roof mount system of claim 13 further comprising securing with the at least one fastener the seal member, the block member and the at least one flashing in place on the roof structure.

18. The method for configuring a solar-rack ready roof mount system of claim 13 wherein the fastener includes a self-drilling point.

19. The method for configuring a solar-rack ready roof mount system of claim 13 wherein removing of the fastener creates a pilot hole sized for the receipt of a second fastener.

20. The method for configuring a solar-rack ready roof mount system of claim 13 wherein the detaching the block member, at least one fastener, and cap member and installing racking and solar panels, all not requiring disruption, disturbance or separating of roofing shingles.

\* \* \* \* \*